(12) United States Patent
Demidov et al.

(10) Patent No.: US 7,277,610 B2
(45) Date of Patent: Oct. 2, 2007

(54) OPTICAL FIBER AND SYSTEM CONTAINING SAME

(75) Inventors: Andrey A. Demidov, Duxbury, MA (US); Hong Po, Sherborn, MA (US)

(73) Assignee: Nufern, East Granby, CT (US)

( * ) Notice: Subject to any disclaimer, the term of this patent is extended or adjusted under 35 U.S.C. 154(b) by 162 days.

(21) Appl. No.: 10/714,524

(22) Filed: Nov. 14, 2003

(65) Prior Publication Data

US 2004/0156588 A1    Aug. 12, 2004

Related U.S. Application Data

(63) Continuation of application No. PCT/US02/14992, filed on May 13, 2002.

(60) Provisional application No. 60/291,168, filed on May 15, 2001.

(51) Int. Cl.
*G02B 6/34* (2006.01)

(52) U.S. Cl. .................. 385/37; 372/3; 372/6

(58) Field of Classification Search .............. 385/37; 372/3, 6
See application file for complete search history.

(56) References Cited

U.S. PATENT DOCUMENTS

| | | | |
|---|---|---|---|
| 4,063,106 A | 12/1977 | Ashkin et al. | |
| 4,616,898 A | 10/1986 | Hicks, Jr. | |
| 4,699,452 A | 10/1987 | Mollenauer et al. | |
| 4,794,598 A | 12/1988 | Desurvire et al. | |
| 4,881,790 A | 11/1989 | Mollenauer | |
| 5,225,925 A | 7/1993 | Grubb et al. | |
| 5,323,404 A | 6/1994 | Grubb | |
| 5,406,411 A | 4/1995 | Button et al. | |
| 5,659,644 A | 8/1997 | DiGiovanni et al. | |
| 5,673,280 A | 9/1997 | Grubb et al. | |
| 5,721,636 A | 2/1998 | Erdogan et al. | |
| 5,778,014 A | 7/1998 | Islam | |
| 5,815,518 A | 9/1998 | Reed et al. | |
| 5,838,700 A | 11/1998 | Dianov et al. | |
| 5,959,750 A | 9/1999 | Eskildsen et al. | |
| 5,966,480 A | 10/1999 | LeGrange et al. | |
| 5,966,481 A * | 10/1999 | Jolley et al. | 385/28 |
| 5,982,791 A | 11/1999 | Sorin et al. | |
| 5,991,314 A * | 11/1999 | Ionov et al. | 372/6 |
| 6,018,534 A * | 1/2000 | Pan et al. | 372/6 |
| 6,052,393 A | 4/2000 | Islam | |
| 6,081,366 A | 6/2000 | Kidorf et al. | |

(Continued)

FOREIGN PATENT DOCUMENTS

EP    0 954 072 A1    11/1999

(Continued)

OTHER PUBLICATIONS

Chang et al.; "A novel intra-cavity for efficient cascaded Raman generation using WDM couplers"; OFC 2001, Anaheim; WDD14-1.

(Continued)

*Primary Examiner*—Ellen E. Kim
(74) *Attorney, Agent, or Firm*—Peter J. Rainville

(57) ABSTRACT

Optical fibers (e.g., fiber amplifiers and fiber lasers), and systems containing optical fibers (e.g., fiber amplifier systems and fiber laser systems) are disclosed.

121 Claims, 10 Drawing Sheets

U.S. PATENT DOCUMENTS

| | | | |
|---|---|---|---|
| 6,088,152 | A | 7/2000 | Berger et al. |
| 6,122,421 | A * | 9/2000 | Adams et al. ............... 385/37 |
| 6,147,794 | A | 11/2000 | Stentz |
| 6,151,160 | A | 11/2000 | Ma et al. |
| 6,163,396 | A | 12/2000 | Webb |
| 6,163,552 | A | 12/2000 | Engelberth et al. |
| 6,163,554 | A * | 12/2000 | Chang et al. ................. 372/6 |
| 6,163,636 | A | 12/2000 | Stentz et al. |
| 6,181,464 | B1 | 1/2001 | Kidorf et al. |
| 6,181,465 | B1 * | 1/2001 | Grubb et al. ............... 359/337 |
| 6,191,877 | B1 | 2/2001 | Chraplyvy et al. |
| 6,292,288 | B1 | 9/2001 | Akasaka et al. |
| 6,310,899 | B1 | 10/2001 | Jacobovitz-Veselka |
| 6,344,925 | B1 | 2/2002 | Grubb et al. |
| 6,374,006 | B1 | 4/2002 | Islam et al. |
| 6,407,855 | B1 | 6/2002 | MacCormack et al. |
| 6,426,965 | B1 | 7/2002 | Chang et al. |
| 6,433,920 | B1 | 8/2002 | Welch et al. |
| 6,490,078 | B2 * | 12/2002 | Enomoto et al. ........ 359/341.1 |
| 6,549,329 | B2 | 4/2003 | Vail et al. |
| 6,594,288 | B1 | 7/2003 | Putnam et al. |
| 6,603,593 | B2 | 8/2003 | Fidric et al. |
| 6,603,595 | B2 | 8/2003 | Welch et al. |
| 6,606,337 | B1 | 8/2003 | King |
| 6,621,835 | B1 | 9/2003 | Fidric |
| 6,674,773 | B1 * | 1/2004 | Cotteverte et al. ............. 372/6 |
| 6,717,963 | B1 * | 4/2004 | Foursa ........................ 372/3 |
| 6,845,202 | B2 * | 1/2005 | Paek et al. .................. 385/123 |
| 6,959,021 | B2 * | 10/2005 | Po et al. ....................... 372/6 |
| 2002/0001125 | A1 | 1/2002 | Chang et al. |
| 2002/0024722 | A1 | 2/2002 | Tsuzaki et al. |
| 2002/0085596 | A1 * | 7/2002 | Irie et al. ..................... 372/36 |
| 2002/0097480 | A1 | 7/2002 | Dominic et al. |
| 2002/0097483 | A1 | 7/2002 | Vail et al. |
| 2002/0126714 | A1 | 9/2002 | Po et al. |
| 2002/0163712 | A1 * | 11/2002 | Hamoir ..................... 359/334 |
| 2002/0163713 | A1 | 11/2002 | Welch et al. |
| 2002/0191277 | A1 | 12/2002 | Chen et al. |
| 2003/0021302 | A1 | 1/2003 | Grudinin et al. |
| 2003/0076577 | A1 | 4/2003 | Dominic et al. |
| 2004/0179797 | A1 | 9/2004 | Po et al. |
| 2005/0024716 | A1 * | 2/2005 | Nilsson et al. .......... 359/341.31 |

FOREIGN PATENT DOCUMENTS

| | | |
|---|---|---|
| EP | 0 954 072 B1 | 4/2000 |
| EP | 1 018 666 A1 | 7/2000 |
| EP | 1 124 295 A2 | 8/2001 |
| EP | 1 225 666 A2 | 7/2002 |
| EP | 1 257 023 A2 | 11/2002 |
| EP | 1 309 113 A2 | 5/2003 |
| JP | 58121694 (ABS) | 7/1983 |
| JP | 59165488 (ABS) | 9/1984 |
| JP | 63202085 (ABS) | 8/1988 |
| JP | 1196189 (ABS) | 8/1989 |
| WO | WO96/37936 | 11/1996 |
| WO | WO99/50941 | 10/1999 |
| WO | WO 01/33285 A2 | 5/2001 |
| WO | WO 01/33285 A3 | 5/2001 |
| WO | WO 02/063728 A2 | 8/2002 |
| WO | WO 03/005068 A2 | 1/2003 |
| WO | WO 03/014771 A2 | 2/2003 |
| WO | WO 03/014771 A3 | 2/2003 |
| WO | WO 02/063728 A3 | 3/2003 |
| WO | WO 03/005068 A3 | 4/2003 |
| WO | WO 02/063728 A3 | 5/2003 |

OTHER PUBLICATIONS

Chang et al.; "Cascaded Raman fibre laser for stable dual-wavelength operation"; Electronics Letters Jun. 7, 2001, vol. 37, No. 12, p. 740-741.

Chang et al.; "Cascaded Raman fibre laser operating at 1.48um"; Electronics Letters Oct. 28, 1999, vol. 35, No. 22, p. 1951-1952.

Chang et al.; "Dual-wavelength cascaded Raman fibre laser"; Electronics Letters Aug. 3, 2000, vol. 36, No. 16, p. 1356-1358.

Chang et al.; "Efficient cascaded Raman generation and signal amplification at 1.3um in GeO2-doped single-mode fibre"; Optics Communications 142 (1997) 289-293.

Chernikov et al.; "High-gain monolithic cascaded Raman fibre amplifier operating at 1.3um"; CLEO '95, Monday Morning, CMB7, 9.30am.

Chernikov et al.; "High-gain, monolithic, cascaded fibre Raman amplifier operating at 1.3um"; Electronics Letters Mar. 16, 1995, vol. 31, No. 6, p. 472-473.

Chernikov et al.; "Raman fibre laser operating at 1.24um"; Electronics Letters Apr. 2, 1998, vol. 34, No. 7, p. 680-681.

Dianov et al.; "Three-cascaded 1407-nm Raman laser based on phosphorus-doped silica fiber"; Optics Letters, vol. 25, No. 6, Mar. 15, 2002, p. 402-404.

Lewis et al.; "Fibre-optic tunable CW Raman laser operating around 1.3um"; Optics Communications 182 (2000) 403-405.

Persephonis et al.; "Cascaded CW fibre Raman laser source 1.6-1.9um"; Electronics Letters Aug. 1, 1996, vol. 32, No. 16, p. 1486-1487.

Prabhu et al.; "Simultaneous two-color CW Raman fiber laser with maximum output power of 1.05W / 1239nm and 0.95W / 1484 nm etc."; Optics Communications 182 (2000) 305-309.

Stentz et al.; "Figure-eight fibre laser with largely unbalanced central coupler"; Electronics Letters Aug. 4, 1994, vol. 30, No. 16, p. 1302-1303.

Stentz et al.; "Polarization effects and nonlinear switching in fiber figure-eight lasers"; Optics Letters, vol. 19, No. 18, Sep. 15, 1994, p. 1462-1464.

Xu et al.; "Output characteristics of a fibre Raman laser with a composite GeO2 and P2O5-doped silica fibre"; Journal of Modern Optics, 2001, vol. 48, No. 7, 1269-1279.

Kidorf et al.; "Pump Interactions in a 100-nm Bandwidth Raman Amplifier"; IEEE Photonics Technology Letters, vol. 11, No. 5, May 1999, p. 530-532.

Hill et al.; "Low-threshold cw Raman laser"; Applied Physics Letters, vol. 29, No. 3, Aug. 1, 1976, p. 181-183.

Jain et al.; "A tunable multiple Stokes cw fiber Raman oscillator"; Applied Physics Letters, vol. 31, No. 2, Jul. 15, 1977, p. 89-90.

Papernyi et al.; "Efficient dual-wavelength Raman fiber laser"; OFC 2001, Technical Digest, WDD15-1.

Mermelstein et al.; "A High-Efficiency Power-Stable Three-Wavelength Configurable Raman Fiber Laser"; OFC 2001, Anaheim, Post Deadline, PD3-1.

Chernikov et al.; "Broadband Raman amplifiers in the spectral range of 1480-1620 nm"; OFC 1999, WG6-1/117.

Demidov et al.; "Three-wavelength Raman fiber laser with reliable dynamic control"; Optics Letters, vol 28, No. 17, Sep. 1, 2003, p. 1540-1542.

U.S. Appl. No. 10/771,002, filed Feb. 3, 2004, Demidov et al.

* cited by examiner

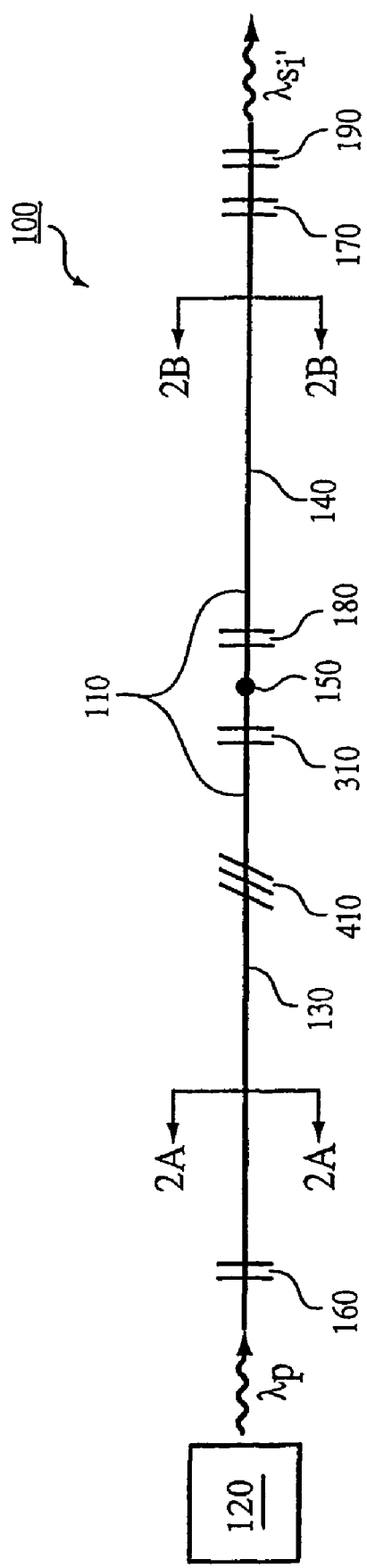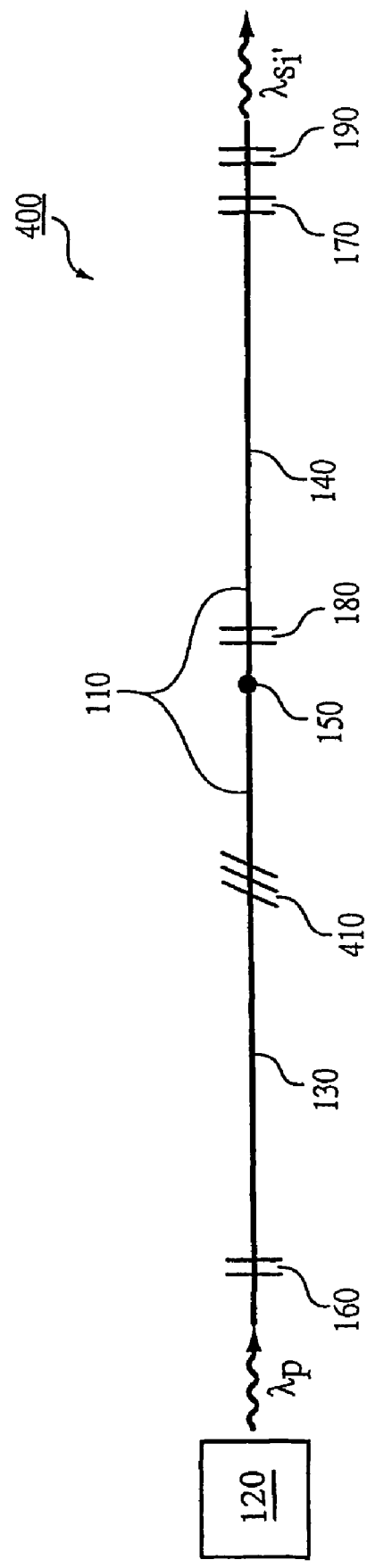

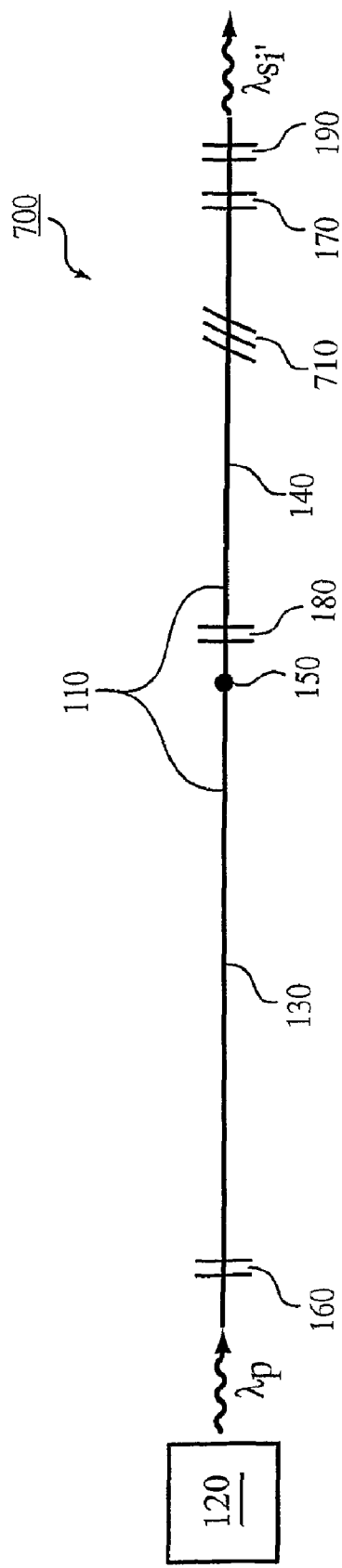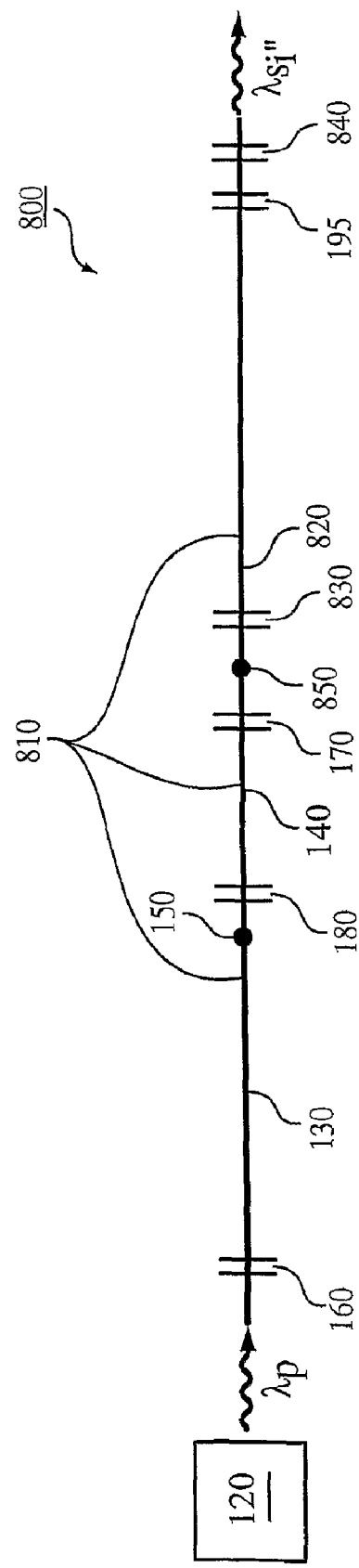
FIG. 7
FIG. 8

OPTICAL FIBER AND SYSTEM CONTAINING SAME

CROSS-REFERENCE TO RELATED APPLICATIONS

This application is a continuation of International Application No. PCT/US02/14992, which has an international filing date of May 13, 2002, and is entitled "Optical Fiber and System Containing Same", and which in turn claims priority to U.S. Provisional Patent Application Ser. No. 60/291,168, which was filed May 15, 2001 and is also entitled "Optical Fiber and System Containing Same". The foregoing applications are incorporated herein by reference.

TECHNICAL FIELD

The invention relates to optical fibers (e.g., fiber amplifiers and fiber lasers), and systems containing optical fibers (e.g., fiber amplifier systems and fiber laser systems).

BACKGROUND

Certain optical fibers can be used as fiber amplifiers or fiber lasers.

Fiber amplifiers are typically used to amplify an input signal. Often, the input signal and a pump signal are combined and passed through the fiber amplifier to amplify the signal at the input wavelength. The amplified signal at the input wavelength can then be isolated from the signal at undesired wavelengths.

Raman fiber lasers can be used, for example, as energy sources. In general, Raman fiber lasers include a pump source coupled to a fiber, such as an optical fiber, having a gain medium with an active material. Energy emitted from the pump source at a certain wavelength $\lambda_p$, commonly referred to as the pump energy, is coupled into the fiber. As the pump energy interacts with the active material in the gain medium of the fiber, one or more Raman Stokes transitions can occur within the fiber, resulting in the formation of energy within the fiber at wavelengths corresponding to the Raman Stokes shifts that occur (e.g., $\lambda_{s1}$, $\lambda_{s2}$, $\lambda_{s3}$, $\lambda_{s4}$, etc.).

Typically, a Raman fiber laser is designed so that the energy formed at one or more Raman Stokes shifts is substantially confined within the fiber. This can enhance the formation of energy within the fiber at one or more higher order Raman Stokes shifts. Often, the fiber is also designed so that at least a portion of the energy at wavelengths corresponding to predetermined, higher order Raman Stokes shifts (e.g., $\lambda_{sx}$, where x is equal to or greater than one) is allowed to exit the fiber.

SUMMARY

In general, the invention relates to optical fibers (e.g., fiber amplifiers and fiber lasers), and systems containing optical fibers (e.g., fiber amplifier systems and fiber laser systems).

In one aspect, the invention features a fiber (e.g., a fiber laser or a fiber amplifier). The fiber includes an optical fiber having a first section and a second section coupled to the first section. The first section has a gain medium including a first active material, and the second section has a gain medium including a second active material. The second active material can be the same as or different than the first active material. The optical fiber also includes a first reflector disposed in the first section of the optical fiber. The first reflector is configured to reflect substantially all energy impinging thereon at a first wavelength. The optical fiber further includes a second reflector disposed in the optical fiber outside the first section of the optical fiber. The second reflector is configured to reflect substantially all energy impinging thereon at the first wavelength.

In another aspect, the invention features a system that includes an energy source capable of emitting energy at a pump wavelength and a fiber (e.g., a fiber amplifier or a fiber laser). The fiber includes an optical fiber having a first section and a second section coupled to the first section. The first section has a gain medium including a first active material, and the second section has a gain medium including a second active material. The second active material can be the same as or different than the first active material. The optical fiber also includes a first reflector disposed in the first section of the optical fiber. The first reflector is configured to reflect substantially all energy impinging thereon at a first wavelength. The optical fiber further includes a second reflector disposed in the optical fiber outside the first section of the optical fiber. The second reflector is configured to reflect substantially all energy impinging thereon at the first wavelength. The energy source and the optical fiber are configured so that energy at the pump wavelength emitted by the energy source can be coupled into the optical fiber.

In another aspect, the invention features a fiber (e.g., a fiber amplifier or a fiber laser). The fiber includes an optical fiber having a first section and a second section spliced to the first section. The first section has a gain medium including a first active material, and the second section has a gain medium including a second active material. The second active material can be the same as or different from the first active material. The optical fiber also includes a first reflector disposed in the first section of the optical fiber, and the first reflector is configured to reflect substantially all energy impinging thereon at a first wavelength. The optical fiber further includes second reflector disposed in the second section of the optical fiber, and the second reflector is configured to reflect substantially all energy impinging thereon at the first wavelength. In addition, the optical fiber includes a third reflector disposed in the second section of the optical fiber. The third reflector is configured to partially reflect energy impinging thereon at a second wavelength different from the first wavelength. The optical fiber also includes a fourth reflector disposed in the second section of the optical fiber and between the first and third reflectors. The fourth reflector is configured to reflect substantially all energy impinging thereon at the second wavelength.

In a further aspect, the invention features a fiber system (e.g., a fiber laser system or a fiber amplifier system). The system includes an energy source capable of emitting energy at a pump wavelength and a fiber. The fiber includes an optical fiber having a first section and a second section spliced to the first section. The first section has a gain medium including a first active material, and the second section has a gain medium including a second active material. The second active material can be the same as or different than the first active material. The optical fiber also includes a first reflector disposed in the first section of the optical fiber, and the first reflector is configured to reflect substantially all energy impinging thereon at a first wavelength. The optical fiber further includes a second reflector disposed in the second section of the optical fiber, and the second reflector is configured to reflect substantially all energy impinging thereon at the first wavelength. In addition, the optical fiber includes a third reflector disposed in the second section of the optical fiber. The third reflector is configured to partially reflect energy impinging thereon at a second wavelength different than the first wavelength. The optical fiber also includes a fourth reflector disposed in the second section of the optical fiber and between the first and third reflectors. The fourth reflector is configured to reflect substantially all energy impinging thereon at the second wavelength. The energy source and the optical fiber are configured so that energy at the pump wavelength emitted by the energy source can be coupled into the optical fiber.

In one aspect, the invention features a fiber (e.g., a fiber amplifier or a fiber laser) including an optical fiber having N sections. The N sections are coupled together. At least one of the N sections of the optical fiber has a gain medium with an active material. The optical fiber also includes a plurality of reflectors disposed in the optical fiber. N is an integer having a value of at least three.

N can be, for example, 3, 4, 5, 6, 7, 8, 9 or 10.

At least two of the N sections of the optical fiber can have a gain medium with an active material. The active material in one of the at least two of the N sections of the optical fiber can be different than an active material of another of the N sections of the optical fiber having a gain medium.

Each of the N sections of the optical fiber have a gain medium with an active material.

The optical fiber can have a first section with an end configured to receive energy at a wavelength $\lambda_p$. The first section of the optical fiber can have a first reflector disposed therein. The first reflector can be configured to reflect substantially all energy impinging thereon at a wavelength $\lambda_{s1}$, where $\lambda_{s1}^{-1} = \lambda_p^{-1} - \lambda_{r1}^{-1}$, $(c/\lambda_{r1})$ is the Raman Stokes shift frequency for an active material in a gain medium in the first section of the optical fiber, and c is the speed of light.

The optical fiber can have an $N^{th}$ section with an end opposite the end of the first section. The $N^{th}$ section of the optical fiber can have a first reflector disposed therein. The first reflector can be configured to reflect substantially all energy impinging thereon at a wavelength $\lambda_{s1n}$, where $\lambda_{s1n}^{-1} = \lambda_{s1(n-1)}^{-1} - \lambda_m^{-1}$, and $c/\lambda_m$) is the Raman Stokes shift frequency for an active material in a gain medium in the $N^{th}$ section of the optical fiber.

The $N^{th}$ section of the optical fiber can have a second reflector disposed therein. The second reflector can be configured to partially reflect energy impinging thereon at the wavelength $\lambda_{s1n}$.

The $N^{th}$ section of the optical fiber can have a third reflector disposed therein. The third reflector can be configured to reflect substantially all energy impinging thereon at the wavelength $\lambda_{s1(n-1)}$, where $\lambda_{s1(n-1)}^{-1} = \lambda_{s1(n-2)}^{-1} - \lambda_{r(n-1)}^{-1}$, and $(c/\lambda_{r(n-1)})$ is the Raman Stokes shift frequency for the active material in the $(N-1)^{th}$ section of the fiber.

Each of the remaining sections of the optical fiber can have two reflectors disposed therein. One of the reflectors disposed in each of the remaining sections of the optical fiber can be configured to reflect substantially all energy impinging thereon at a wavelength $\lambda_{s1m}$, where $\lambda_{s1m}^{-1} = \lambda_{s1(m-1)}^{-1} - \lambda_{rm}^{-1}$, and $(c/\lambda_{rm})$ is the Raman Stokes shift frequency for an active material in the section of the fiber.

The other reflectors can be disposed in each of the remaining sections of the optical fiber and configured to reflect substantially all energy impinging thereon at a wavelength $\lambda_{s1(m-1)}$, where $\lambda_{s1(m-1)}^{-1} = \lambda_{s1(m-2)}^{-1} - \lambda_{r(m-1)}^{-1}$, and $(c/\lambda_{r(m-1)})$ is the Raman Stokes shift frequency for an active material in an immediately preceding section of the optical fiber.

In another aspect, the invention features a fiber system (e.g., a fiber amplifier system or a fiber laser system) that includes an energy source and a fiber. The fiber includes an optical fiber having N sections. The N sections are coupled together. At least one of the N sections of the optical fiber has a gain medium with an active material. The optical fiber also includes a plurality of reflectors disposed in the optical fiber. N is an integer having a value of at least three, and the energy source and the optical fiber are configured so that energy at a wavelength emitted by the energy source can be coupled into the optical fiber.

In a further aspect, the invention features a fiber (e.g., a fiber amplifier or a fiber laser) that includes an optical fiber having at least first and second sections coupled together. The first section has a first gain medium with a first active material, and the second section has a second gain medium with a second active material different. The second active material can be the same as or different than the first active material. The optical fiber is configured to be capable of receiving energy at a first wavelength and to be capable of outputting energy at a second wavelength longer than the first wavelength. The optical fiber also includes a plurality of reflectors disposed in the optical fiber. The plurality of optical fibers are configured so that energy propagating in the optical fiber at the first wavelength undergoes at least one Raman Stokes shift to create energy in the optical fiber at the second wavelength, and so that, when the optical fiber receives energy at the first wavelength, a power output by the optical fiber at the second wavelength is at least about 55% of a power of the energy the optical fiber receives at that first wavelength.

In another aspect, the invention features an article, such as a fiber amplifier or a fiber laser, that includes an optical fiber having multiple sections. At least two of the fiber sections have gain media that contain different active materials. The number of sections can be, for example, 3, 4, 5, 6, 7, 8, 9 or 10. Each section can have a gain medium. The gain medium in each section can contain the same or different active material as the other sections of fiber. The article can be used in a system that includes an energy source (e.g., a laser) capable of emitting energy that can be coupled into the fiber.

In some embodiments, the invention can provide a Raman fiber laser having a relatively high output power at a desired wavelength (e.g., at least about 0.1 Watt, at least about 0.5 Watt, at least about 1 Watt, at least about 2 Watts, at least about 5 Watts, at least about 10 Watts). Such a Raman fiber laser can operate, for example, under conditions of relatively high pump power (e.g., at least about 0.1 Watt, at least about 0.5 Watt, at least about 1 Watt, at least about 2 Watts, at least about 5 Watts, at least about 10 Watts).

In certain embodiments, the invention can provide a Raman fiber laser having a relatively low output power at one or more undesired wavelengths (e.g., less than about 1 Watt, less than about 0.5 Watt, less than about 0.1 Watt, less than about 0.05 Watt). Such a Raman fiber laser can operate, for example, under conditions of relatively high pump power (e.g., at least about 0.1 Watt, at least about 0.5 Watt, at least about 1 Watt, at least about 2 Watts, at least about 5 Watts, at least about 10 Watts).

In some embodiments, the invention can provide a Raman fiber laser that can convert energy entering the Raman fiber laser at a particular wavelength (e.g., a pump wavelength) to energy exiting the Raman fiber laser at a different wavelength (e.g., a desired wavelength) with relatively high efficiency (e.g., an efficiency of: at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 98%).

In certain embodiments, the invention can provide a Raman fiber laser that can convert energy entering the Raman fiber laser at a particular wavelength (e.g., a pump wavelength) to energy exiting the Raman fiber laser at wavelengths other than a desired wavelength with relatively low efficiency (e.g., an efficiency of: at most about 45%, at most about 40%, at most about 35%, at most about 30%, at most about 25%, at most about 20%, at most about 15%, at most about 10%, at most about 5%, at most about 2%).

The Raman fiber lasers can provide these properties when the difference between the pump energy and the output energy is any value (e.g., relatively small or relatively large). In some embodiments, the difference between the pump energy and the output energy can be relatively large (e.g., at least about 100 cm$^{-1}$, at least about 200 cm$^{-1}$, at least about 500 cm$^{-1}$, at least about 1,000 cm$^{-1}$, at least about 1,250 cm$^{-1}$, at least about 1,500 cm$^{-1}$, at least about 1,750 cm$^{-1}$, at least about 2,000 cm$^{-1}$).

In certain embodiments, the fibers can be used as amplifiers rather than lasers.

Features, objects and advantages of the invention are in the description, drawings and claims.

DESCRIPTION OF DRAWINGS

FIG. 1 is a schematic representation of an embodiment of a Raman fiber laser system;

FIG. 4 is a schematic representation of an embodiment of a Raman fiber laser system;

FIG. 7 is a schematic representation of an embodiment of a Raman fiber laser system;

FIG. 8 is a schematic representation of an embodiment of a Raman fiber laser system;

DETAILED DESCRIPTION

Figure 2B:
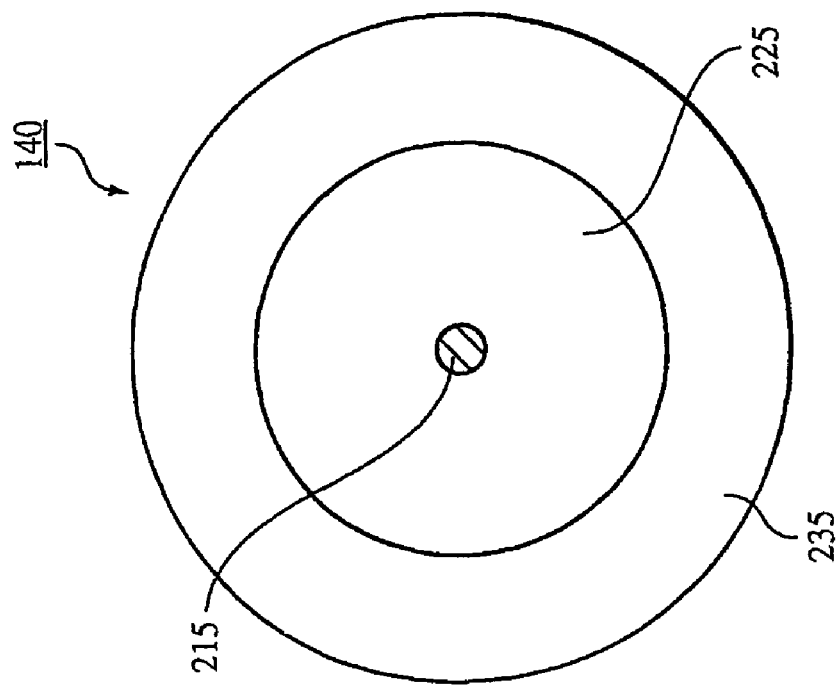
FIGS. 2A and 2B are cross-sectional views of sections of an optical fiber.

FIG. 1 shows an embodiment of a Raman fiber laser system 100 including an optical fiber 110 and a laser 120. Laser 120 is configured so that energy emitted by laser 120 at a wavelength $\lambda_p$ is coupled into optical fiber 110. Optical fiber 110 has a first section 130 having a gain medium containing a active material and a second section 140 having a gain medium containing a different active material. Examples of active materials include $GeO_2$, $P_2O_5$, $SiO_2$, $B_2O_3$, $SiO_xF_y$, and the like. Sections 130 and 140 of optical fiber 110 are spliced together at region 150.

Figure 2A:
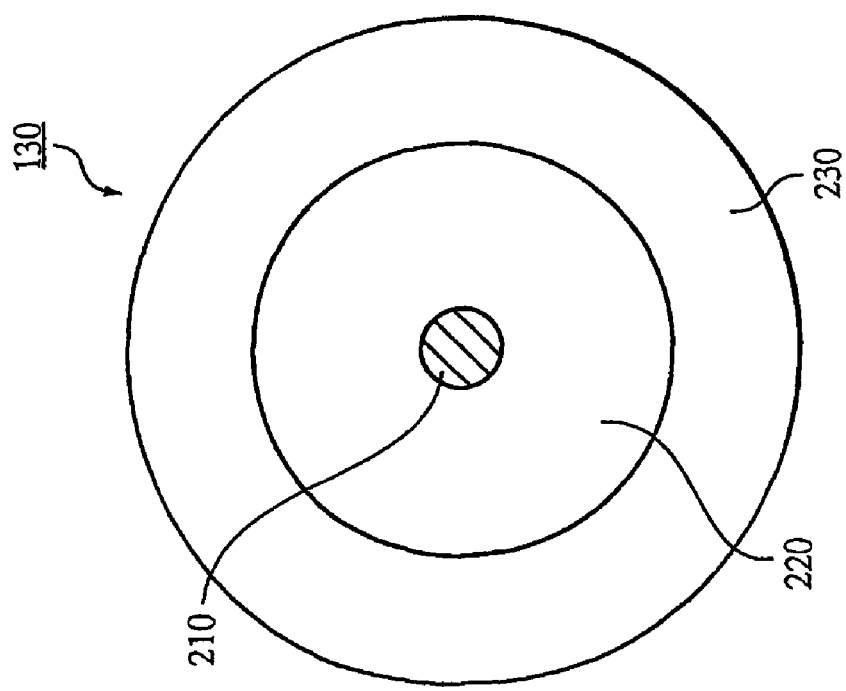

FIGS. 2A and 2B are cross-sectional views of sections 130 and 140, respectively, of optical fiber 110. As shown in FIG. 2A, section 130 has a gain medium 210 containing an active material, a cladding 220 (e.g., a fused silica layer) and an additional layer 230 (e.g., a polymer layer). As shown in FIG. 2B, section 140 has a gain medium 215 containing an active material, a cladding 225 (e.g., a fused silica layer) and an additional layer 235 (e.g., a polymer layer). Although FIGS. 2A and 2B show a particular design of optical fiber 110, other designs of appropriate optical fibers are known to those skilled in the art and are contemplated.

Referring to FIG. 1, optical fiber 110 also includes a first pair of reflectors 160 and 170 (e.g., a pair of fiber Bragg gratings), and a second pair of reflectors 180 and 190 (e.g., a pair of fiber Bragg gratings). Reflectors 160 and 170 are designed to reflect substantially all (e.g., about 100%) energy impinging thereon at a wavelength $\lambda_{s1}$, where $\lambda_{s1}^{-1} = \lambda_p^{-1} - \lambda_r^{-1}$, and $(c/\lambda_r)$ is the Raman Stokes shift frequency for the active material in gain medium 210, and c is the speed of light.

Reflector 180 is designed to reflect substantially all (e.g., about 100%) energy impinging thereon at wavelength $\lambda_{s1'}$, and reflector 190 is designed to reflect a portion (e.g., less than about 98%, less than about 95%, less than about 90%, less than about 80%, less than about 70%, less than about 60%, less than about 50%, less than about 40%, less than about 30%, less than about 20%, less than about 10%) of energy impinging thereon at wavelength $\lambda_{s1'}$, where $\lambda_{s1'}^{-1} = \lambda_{s1}^{-1} - \lambda_{r'}^{-1}$, and $(\lambda_{r'})$ is the Raman Stokes shift frequency for the active material in gain medium 215.

Section 130 of optical fiber 110 further includes a reflector 310 (e.g., a fiber Bragg grating). Reflector 310 is designed to reflect substantially all (e.g., about 100%) energy propagating in section 130 at $\lambda_p$, which reduces (e.g., eliminates) the propagation of energy at $\lambda_p$ in section 140 of fiber 110.

Section 130 of optical fiber 110 also includes a suppressor 410. Suppressor 410 is designed to suppress the formation of higher order Raman Stokes shifts for the active material in section 130 of fiber 110 (e.g., one or more of $\lambda_{s2}$, $\lambda_{s3}$, $\lambda_{s4}$, etc.).

With this arrangement, as energy at wavelength $\lambda_p$ enters optical fiber 110, the energy propagates through section 130 until it impinges upon reflector 310, where it is reflected and propagates through section 130 in the reverse direction so that substantially no energy at wavelength $\lambda_p$ enters section 140 of fiber 110. Reflector 310 can increase the amount of energy at $\lambda_{s1}$ propagating in fiber 110 (relative to an otherwise substantially similar system without reflector 310) by increasing the effective optical length of energy at $\lambda_p$ in section 130 of fiber 110, which, in turn, can increase the amount of energy $\lambda_{s1'}$ propagating in section 140 of fiber 110 (see discussion below). Reflector 310 can also decrease the formation of energy at wavelength $\lambda_u$, where $\lambda_u^{-1} = \lambda_p^{-1} - \lambda_{r'}^{-1}$, (see discussion below).

As energy at wavelength $\lambda_p$ propagates through section 130 in the forward and reverse directions, it creates energy at wavelength $\lambda_{s1}$. Energy at wavelength $\lambda_{s1}$ propagates through sections 130 and 140 until it reaches reflector 170 where it is reflected by reflector 170. Energy at wavelength $\lambda_{s1}$ then propagates through sections 140 and 130 in the reverse direction until it reaches reflector 160 where it is reflected forward through sections 130 and 140. Energy at wavelength $\lambda_{s1}$ continues to propagate in fiber 110 in the forward and in reverse directions between reflectors 160 and 170.

As energy at wavelength $\lambda_{s1}$ propagates through section 130 of fiber 110, it can impinge upon suppressor 410, which reduces (e.g., substantially eliminates) the transfer of energy at wavelength $\lambda_{s1}$ to energy at wavelength $\lambda_{s2}$ (and/or energy at higher order Raman Stokes shifts for the active material in gain medium 210). In some embodiments, suppressor 410 is a long period grating (LPG) having a resonance frequency of $(c/\lambda_{s2})$, where $\lambda_{s2}^{-1} = \lambda_{s1}^{-1} - \lambda_r^{-1}$. The LPG can couple energy at wavelength $\lambda_{s2}$ that impinges thereon out of gain medium 210 and into cladding 220. Cladding 220 can be formed of a material (e.g., fused silica) that dissipates energy at $\lambda_{s2}$ relatively quickly. This can suppress the power of wave $\lambda_{s2}$ propagating in fiber 110, which correspondingly can suppress the formation of energy at higher order Raman Stokes shifts propagating in fiber 110. The suppression of higher order Raman Stokes shift(s) can result in fiber 110 having a higher power of wave $\lambda_{s1}$ propagating therein relative to a substantially similar system without suppressor 410. This, in turn, can increase the amount of energy at $\lambda_{s1'}$ propagating in section 140 of fiber 110 (see discussion below).

As energy at wavelength $\lambda_{s1}$ propagates through section 140 of fiber 110, it creates energy at wavelength $\lambda_{s1'}$. Energy at wavelength $\lambda_{s1'}$ propagating in section 140 in the reverse direction is reflected by reflector 180 and then propagates through section 140 in the forward direction. Energy at wavelength $\lambda_{s1'}$ propagating through section 140 in the forward direction impinges on reflector 190. Some of the energy at wavelength $\lambda_{s1'}$ impinging on reflector 190 is reflected by reflector 190 and then propagates through section 140 in the reverse direction, and some of the energy at wavelength $\lambda_{s1'}$ impinging on reflector 190 passes through reflector 190 and exits fiber 110.

Optical fiber 110 can convert energy entering fiber 110 at wavelength $\lambda_p$ to energy exiting fiber 110 at wavelength $\lambda_{s1'}$ with relatively high efficiency. In certain embodiments, fiber 110 can convert at least about 35% (e.g., at least about 40%, at least about 45%, at least about 50%, at least about 55%, at least about 60%, at least about 65%, at least about 70%, at least about 75%, at least about 80%, at least about 85%, at least about 90%, at least about 95%, at least about 98%) of the energy entering fiber 110 at wavelength $\lambda_p$ to energy exiting fiber 110 at wavelength $\lambda_{s1'}$.

Optical fiber 110 can convert energy entering fiber 110 at wavelength $\lambda_p$ to energy exiting fiber 110 at wavelengths other than $\lambda_{s1'}$ with relatively low efficiency. In certain embodiments, fiber 110 can convert at most about 45% (e.g., at most about 40%, at most about 35%, at most about 30%, at most about 25%, at most about 20%, at most about 15%, at most about 10%, at most about 5%, at most about 2%) of the energy entering fiber 110 at wavelength $\lambda_p$ to energy exiting fiber 110 at wavelengths other than $\lambda_{s1'}$.

Without wishing to be bound by theory, it is believed that these characteristics of fiber 110 can be explained using the following system of nonlinear differential equations.

$$\frac{dI_p^+}{dz} = -g_p(I_{\lambda_{s1}}^+ + I_{\lambda_{s1}}^-) \times I_p^+ - \alpha_p I_p^+ = -\frac{dI_p^-}{dz}$$

$$\frac{dI_{\lambda_{s1}}^+}{dz} = -g_1 I_{\lambda_{s1}}^+ \times (I_p^+ + I_p^-) - \alpha_1 I_{\lambda_{s1}}^+ - g_1' I_{\lambda_{s1}}^+ \times (I_{\lambda_{s1'}}^+ + I_{\lambda_{s1'}}^-)$$

-continued $$= -\frac{dI_{\lambda_{s1}}^-}{dz}$$

$$\frac{dI_{\lambda_{s1'}}^+}{dz} = g_{1'} I_{\lambda_{s1'}}^+ \times (I_{\lambda_{s1}}^+ + I_{\lambda_{s1}}^-) - \alpha_{1'} I_{\lambda_{s1'}}^+ = -\frac{dI_{\lambda_{s1'}}^-}{dz}$$

The indices $^+$ and $^-$ represent propagation in fiber 110 from left to right and from right to left, respectively. $I_p$, $I_{\lambda_{s1}}$, and $I_{\lambda_{s1'}}$ represent the intensities of energy propagating in fiber 110 at wavelengths $\lambda_p$, $\lambda_{s1}$ and $\lambda_{s1'}$, respectively. $\alpha_p$, $\alpha_1$ and $\alpha_{1'}$ are the loss coefficients of energy propagating in fiber 110 at wavelengths $\lambda_p$, $\lambda_{s1}$ and $\lambda_{s1'}$, respectively, due to, for example, imperfections, scattering and/or splicing in fiber 110. $g_p$, $g_1$ and $g_{1'}$ are the Raman gain coefficients, respectively, of energy propagating in fiber 110 at wavelengths $\lambda_p$, $\lambda_{s1}$ and $\lambda_{s1'}$, respectively, due to power gain via stimulated Raman scattering (SRS). $g'_1$ is the Raman gain coefficient for the transfer of energy from $\lambda_{s1}$ to $\lambda_{s1'}$. $g'_1 = (\lambda_{s1'}/\lambda_{s1})(A_{s1'}/A_{s1})(g_{1'})$, where $A_{sz}$ is the effective area of the mode at wavelength $\lambda_{sz}$.

It is believed that for fiber 110 the second equation noted above can be decoupled into two systems of equations, with each system of equations being without a $g'_1$ term.

The first system of equations, which is believed to describe the propagation of energy in section 130 of fiber 110, can be written as:

$$\frac{dI_p^+}{dz} = -g_0(I_{\lambda_{s1}}^+ + I_{\lambda_{s1}}^-) \times I_p^+ - \alpha_0 I_p^+ = -\frac{dI_p^-}{dz}$$

$$\frac{d\hat{I}_{\lambda_{s1}}^+}{dz} = g_1 \hat{I}_{\lambda_{s1}}^+ \times (I_p^+ + I_p^-) - \alpha_1 \hat{I}_{\lambda_{s1}}^+ = -\frac{d\hat{I}_{\lambda_{s1}}^-}{dz}$$

The second system of equations, which is believed to describe the propagation of energy in section 140 of fiber 110, can be written as:

$$\frac{d\tilde{I}_{\lambda_{s1}}^+}{dz} = -\tilde{g}_1 \tilde{I}_{\lambda_{s1}}^+ (I_{\lambda_{s1'}}^+ + I_{\lambda_{s1'}}^-) - \tilde{\alpha}_1 \tilde{I}_{\lambda_{s1}}^+ = -\frac{d\tilde{I}_{\lambda_{s1}}^-}{dz}$$

$$\frac{dI_{\lambda_{s1'}}^+}{dz} = g_2 I_{\lambda_{s1'}}^+ \times (\tilde{I}_{\lambda_{s1}}^+ + \tilde{I}_{\lambda_{s1}}^-) - \alpha_2 I_{\lambda_{s1'}}^+ = -\frac{dI_{\lambda_{s1'}}^-}{dz}$$

Figure 3A:
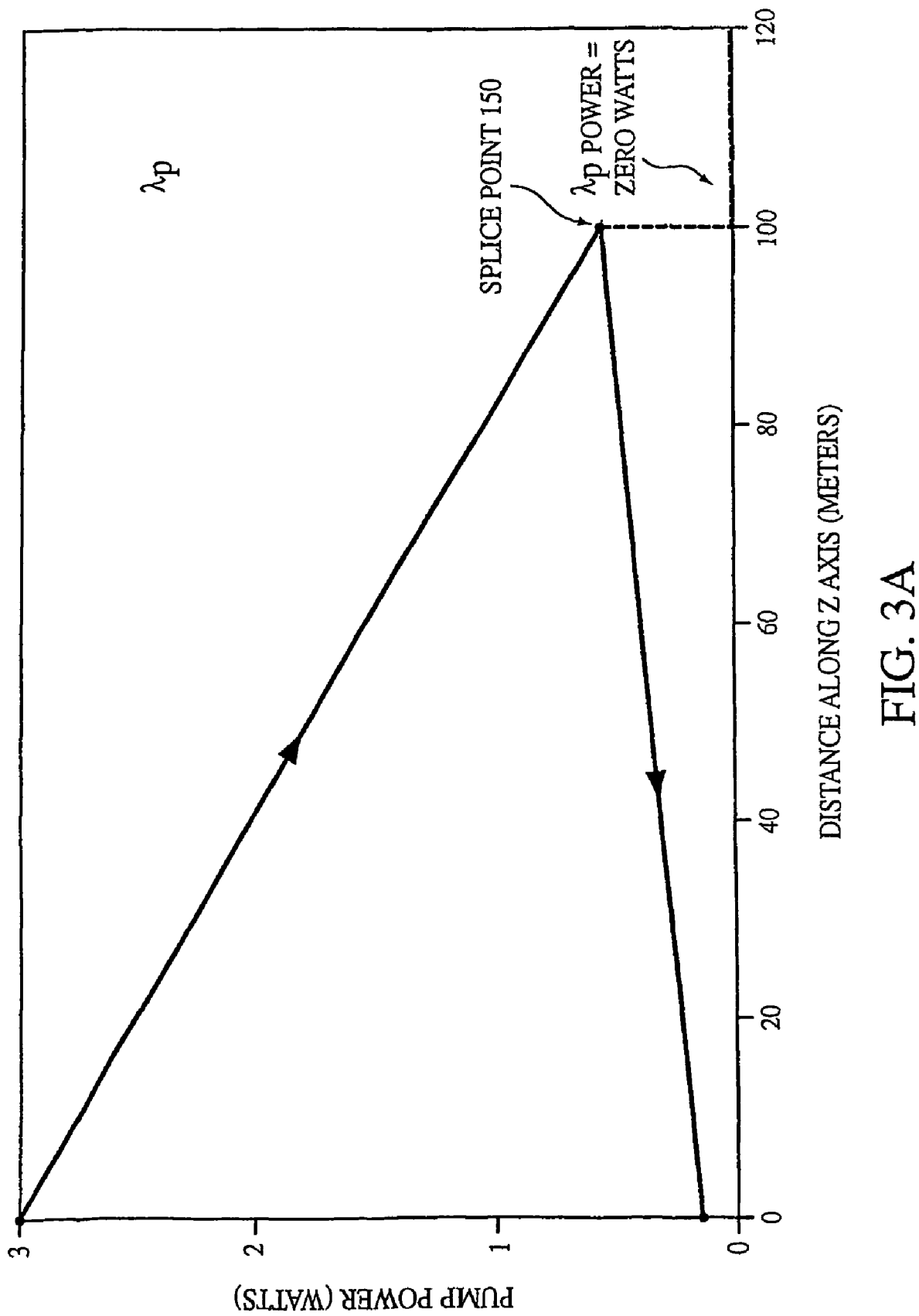
FIGS. 3A-3C are graphs demonstrating the power at three different wavelengths in an optical fiber contained in an embodiment of a Raman fiber laser system.
Figure 3B:
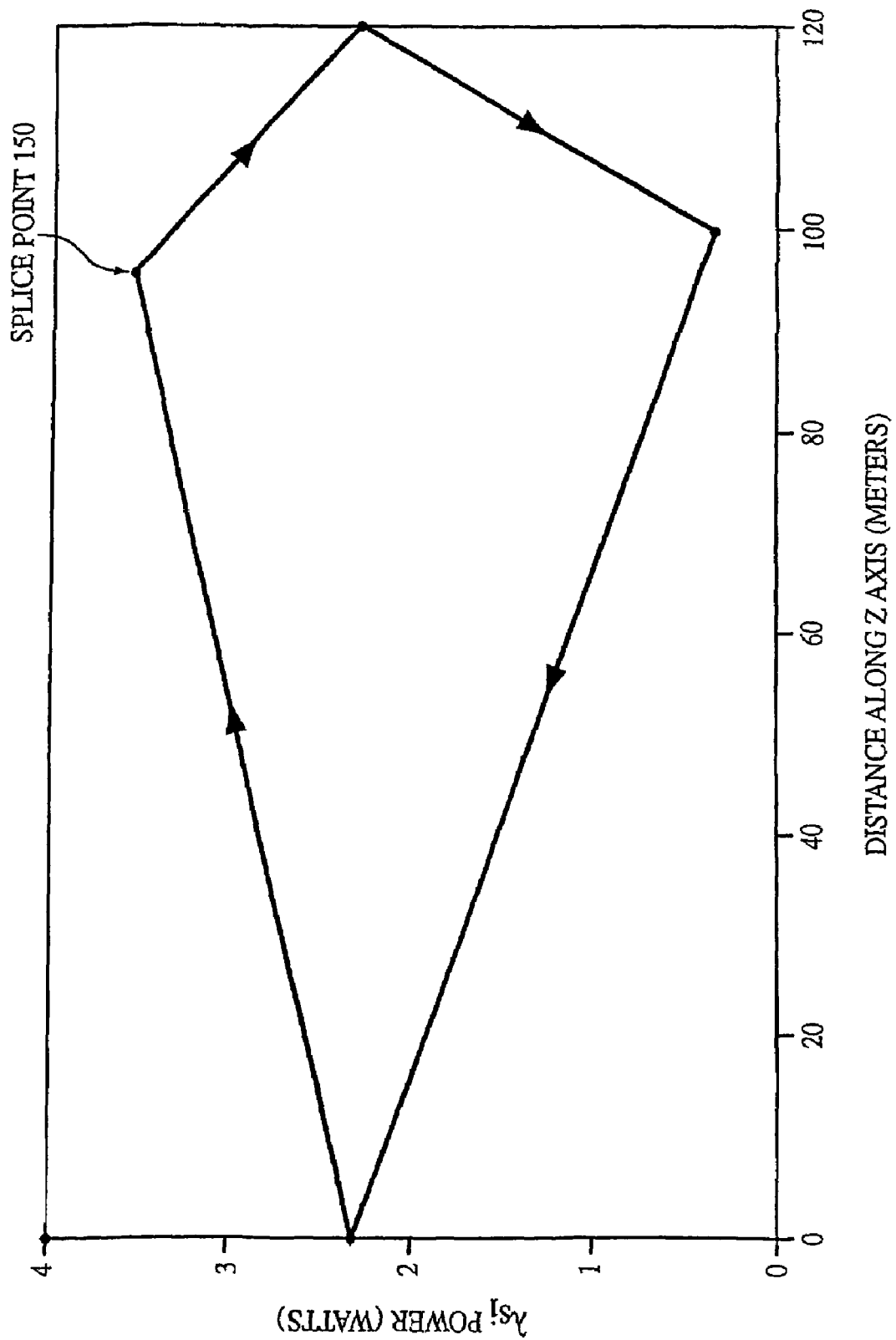
Figure 3C:
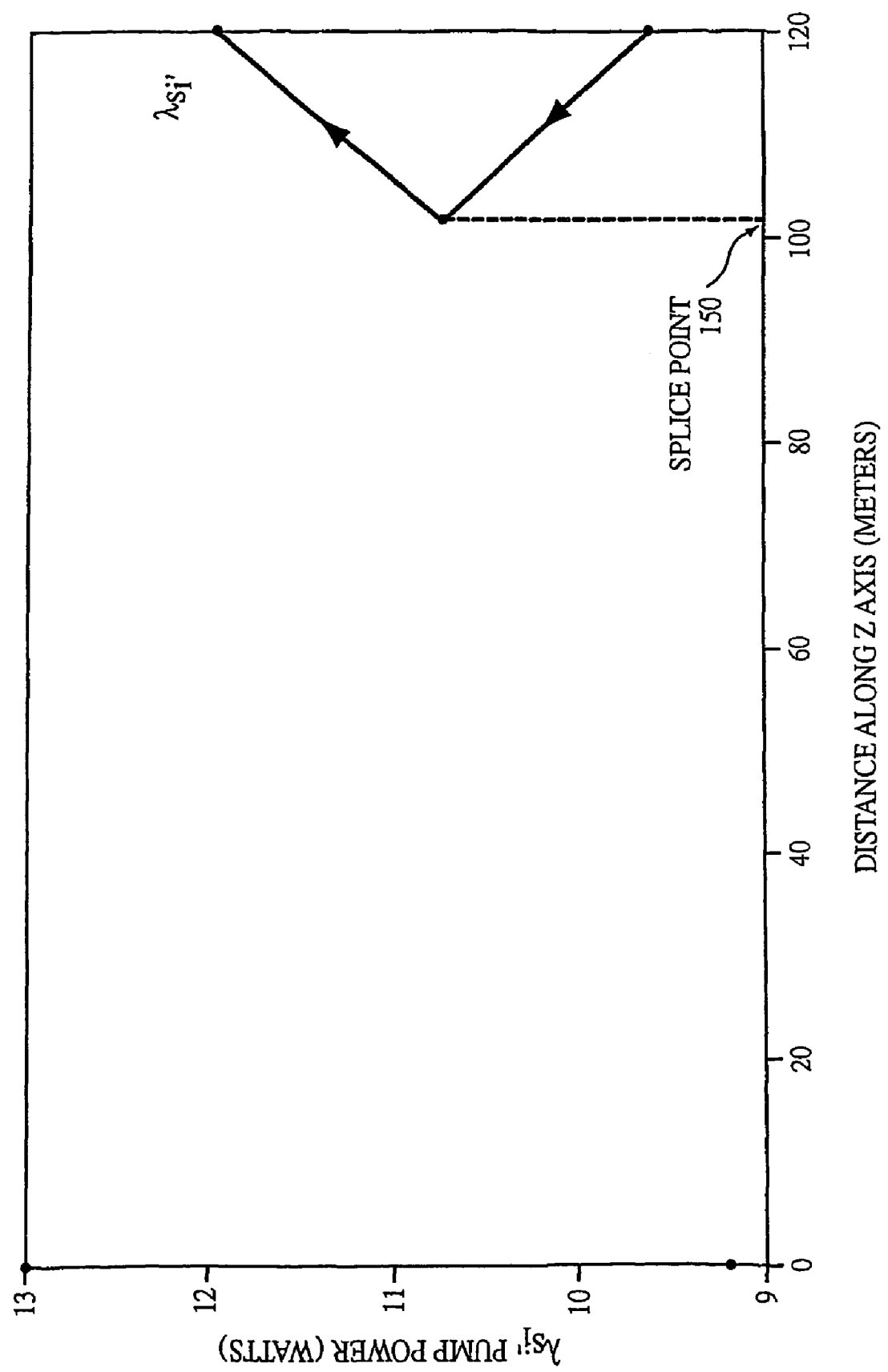

Appropriate boundary conditions for a wave $I_{\lambda_{s1}}$ at splice point 150 are believed to be:

$\hat{I}_{\lambda_{s1}}^+ = \tilde{I}_{\lambda_{s1}}^+$ and $\hat{I}_{\lambda_{s1}}^- = \tilde{I}_{\lambda_{s1}}^-$ FIGS. 3A-3C are graphs of the calculated (based on the above-noted equations) energy distribution at wavelengths $\lambda_p$, $\lambda_{s1}$ and $\lambda_{s1'}$, respectively, for fiber 110 in which section 130 is 100 meters long and the active material in the gain medium of section 130 is $GeO_2$, and in which section 140 is 20 meters long and the active material in the gain medium of section 140 is $P_2O_5$. Reflectors 160 and 170 reflect 100% of energy impinging thereon at wavelength $\lambda_{s1}$. Reflector 180 reflects 100% of energy impinging thereon at wavelength $\lambda_{s1'}$, and reflector 190 reflects about 80% of energy impinging thereon at wavelength $\lambda_{s1'}$. The power at wavelength $\lambda_p$ is 3 Watts upon entering optical fiber 110. Reflectors 180 and 310 are disposed immediately adjacent point 150.

FIG. 3A shows that the power of $\lambda_p$ decreases as it propagates across section 130 from a value of 3 Watts upon entering fiber 110 to a value of about 0.5 Watt at point 150. The power of $\lambda_p$ continues to decrease as it propagates in the reverse direction from point 150, reaching a value of about 0.1 Watt at the end of fiber 110 where the pump energy enters fiber 110.

FIG. 3B shows that the power of $\lambda_{s1}$ increases as it propagates in the forward direction across section 130, starting at a value of about 2.3 Watts at the point where the pump energy enters fiber 110 and obtaining a value of about 3.5 Watts at point 150. The power of $\lambda_{s1}$ increases as it propagates in the reverse direction, starting at a value of about 0.4 Watts at point 150 and obtaining a value of about 2.3 Watts at the point where the pump energy enters fiber 110.

A portion of the energy at wavelength $\lambda_{s1}$ propagating in section 140 in both the forward and reverse directions is transferred to energy at wavelength $\lambda_{s1'}$. As a result, the power of $\lambda_{s1}$ decreases as energy at wavelength $\lambda_{s1}$ propagates in both the forward and reverse directions through section 140 (FIGS. 3B and 3C).

FIG. 3C shows that the power of $\lambda_{s1'}$ increases as it propagates in the forward direction across section 140 from a value of about 10.8 Watts at point 150 to a value of about 12 Watts at the end of fiber 110. The power of $\lambda_{s1'}$ increases as it propagates across section 140 from a value of about 9.6 Watts at the end of fiber 110 to a value of about 10.8 Watts at point 150.

FIG. 4 shows an embodiment of a Raman fiber laser system 400 in which reflector 310 is not present in optical fiber 110. Eliminating reflector 310 may be desirable, for example, when the power of wave $\lambda_p$ is sufficiently low enough at point 150 that the amount of energy created at $\lambda_u$ does not substantially interfere with the desired performance of the system.

Figure 5:
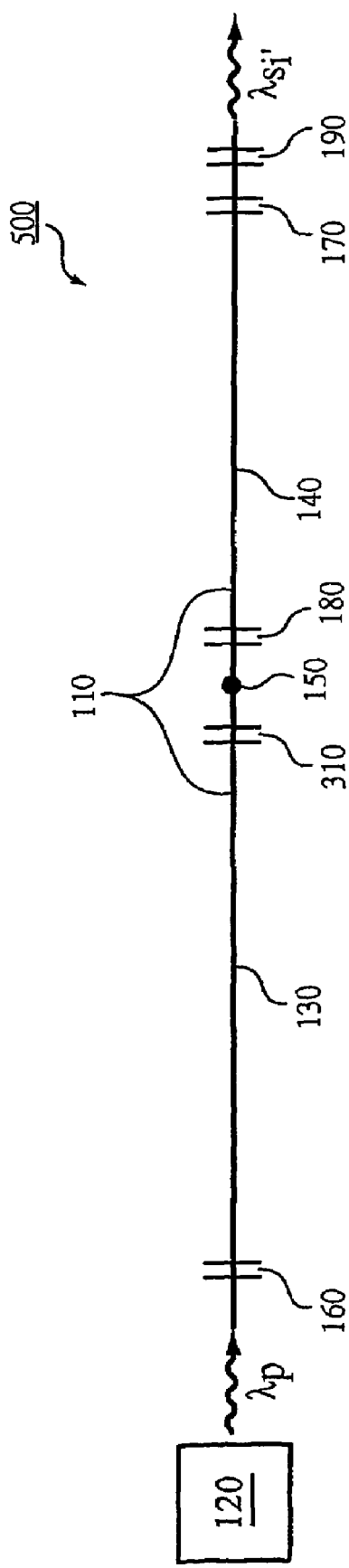
FIG. 5 is a schematic representation of an embodiment of a Raman fiber laser system.

FIG. 5 shows an embodiment of a Raman fiber laser system 500 in which suppressor 410 is not present in optical fiber 110. Eliminating suppressor 410 may be desirable, for example, when the power of wave $\lambda_{s1}$ is sufficiently low enough in section 130 of fiber 110 that the amount of energy created at $\lambda_{s2}$ (and/or energy at higher order Raman Stokes shifts for the active material in gain medium 210) does not substantially interfere with the desired performance of the system.

Figure 6:
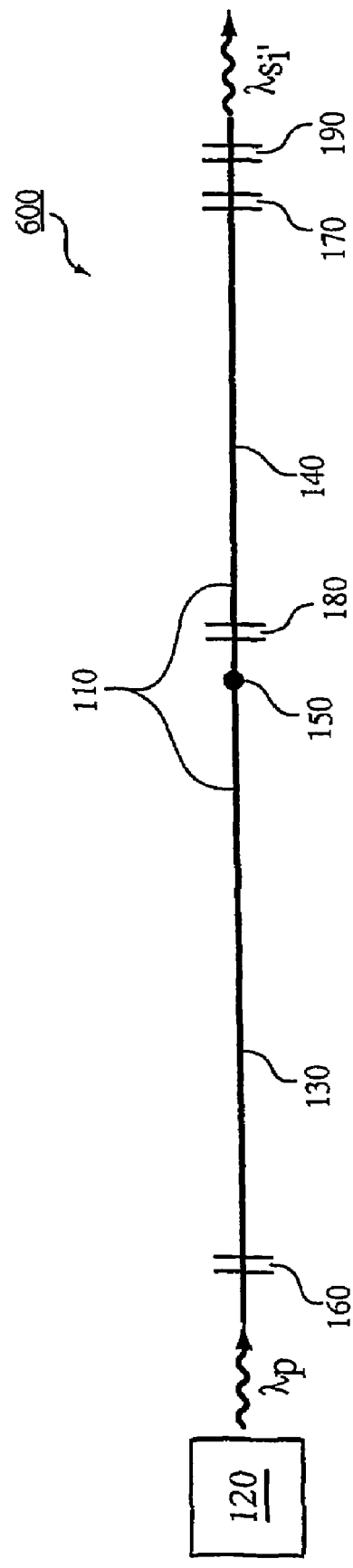
FIG. 6 is a schematic representation of an embodiment of a Raman fiber laser system.

FIG. 6 shows an embodiment of a Raman fiber laser system 600 in which neither reflector nor suppressor 410 are present in optical fiber 110.

FIG. 7 shows an embodiment of a Raman fiber laser system 700 that includes a suppressor 710 in section 140 of optical fiber 110. Suppressor 710 is designed to suppress the formation of energy at higher order Raman Stokes shifts for the active material in gain medium 215 (e.g., energy at one or more $\lambda_{s2'}$, $\lambda_{s3'}$, $\lambda_{s4'}$, etc.). Suppressor 710 can be, for example, an LPG having its resonance frequency at $(c/\lambda_{s2'})$, where $\lambda_{s2'}{}^{-1}=\lambda_{s1'}{}^{-1}-\lambda_{r'}{}^{-1}$. The presence of suppressor 710 in section 140 may be desirable, for example, when the power of wave $\lambda_{s1'}$ in section 140 is sufficiently high that the power of wave $\lambda_{s2'}$ (and/or energy at higher order Raman Stokes shifts for the active material in gain medium 215) that would form in section 140 in the absence of suppressor 710 would substantially interfere with the desired performance of the system. System 700 can optionally include reflector 310 and/or suppressor 410.

While the systems represented in FIGS. 1 and 3-7 have shown reflectors and/or suppressor(s) having particular locations within optical fiber 110, it is to be understood that these components can have different locations (relative locations and/or absolute locations) within fiber 110. For example, the relative positions of reflectors 170 and 190 can be reversed. As another example, reflector 310 can be located in section 140 of fiber 110. As an additional example, reflector 180 can be disposed in section 130 of optical fiber 110 (e.g., to the right or left of point 150), and/or reflectors 170 and 190 can be disposed to the right of section 140 (e.g., in another section of fiber spliced to the right of section 140 of fiber 110). Combinations of these configurations can be used. Other locations of reflectors and/or suppressor(s) in fiber 110 are also contemplated.

FIG. 8 shows an embodiment of a Raman fiber laser system 800 having an optical fiber 810. Optical fiber 810 has a first section 130 having a gain medium containing an active material, and a second section 140 having a gain medium containing an active material that can be different than the active material contained in the gain medium of section 130, and a third section 820 having a gain medium containing an active material that can be different than the active material contained in the gain medium of section 140. The active material in the gain medium of section 820 of fiber 810 can be the same as or different than the active material in the gain medium of section 130 of fiber 810. Sections 140 and 820 are spliced together at region 850.

Optical fiber 810 includes pairs of reflectors 160 and 170, 180 and 195, and also includes a pair of reflectors 830 and 840 (e.g., a pair of fiber Bragg gratings). Reflector 195 (e.g., a fiber Bragg grating) is designed to reflect substantially all (e.g., about 100%) energy at $\lambda_{s1'}$. Reflector 830 is designed to reflect substantially all (e.g., about 100%) energy at wavelength $\lambda_{s1''}$, and reflector 840 is designed to reflect a portion (e.g., less than about 98%, less than about 95%, less than about 90%, less than about 80%, less than about 70%, less than about 60%, less than about 50%, less than about 40%, less than about 30%, less than about 20%, less than about 10%) of energy at wavelength $\lambda_{s1'''}$, where $\lambda_{s1''}{}^{-1}=\lambda_{s1'}{}^{-1}-\lambda_{r''}{}^{-1}$ and $(c/\lambda_{r''})$ is the Raman Stokes frequency shift for the active material in the gain medium section 820 of fiber 810.

With this arrangement, as energy at $\lambda_p$ enters optical fiber 810, the energy propagates through section 130 and creates energy at wavelength $\lambda_{s1}$. Energy at $\lambda_{s1}$ then propagates through sections 130 and 140 in the forward direction until it reaches reflector 170 where it is reflected backward through sections 140 and 130. Energy at $\lambda_{s1}$ then propagates through sections 140 and 130 in the reverse direction until it reaches reflector 160 where it is reflected forward through sections 130 and 140. Energy at $\lambda_{s1}$ continues to propagate in fiber 810 in the forward and reverse directions between reflectors 160 and 170.

As energy at $\lambda_{s1}$ propagates through section 140 of fiber 810, it creates energy at wavelength $\lambda_{s1'}$. Energy at $\lambda_{s1'}$ then propagates through sections 140 and 820 in the forward direction until it reaches reflector 195 where it is reflected backward through sections 820 and 140. Energy at $\lambda_{s1'}$ then propagates through sections 820 and 140 in the reverse direction until it reaches reflector 180 where it is reflected forward through sections 140 and 820. Energy at $\lambda_{s1'}$ continues to propagate in fiber 810 in the forward and reverse directions between reflectors 180 and 195.

As energy at $\lambda_{s1'}$ propagates through section 820 of fiber 810, it creates energy at wavelength $\lambda_{s1''}$. Energy at wavelength $\lambda_{s1''}$ propagating in section 820 in the reverse direction is reflected by reflector 830 and then propagates through section 820 in the forward direction. Energy at wavelength $\lambda_{s1''}$ propagating through section 820 in the forward direction impinges on reflector 840. Some of the energy at wavelength $\lambda_{s1''}$ impinging on reflector 840 is reflected by reflector 840 and then propagates through section 820 in the reverse direction, and some of the energy at wavelength $\lambda_{s1''}$ impinging on reflector 840 passes through reflector 840 and exits fiber 810.

Figure 9:
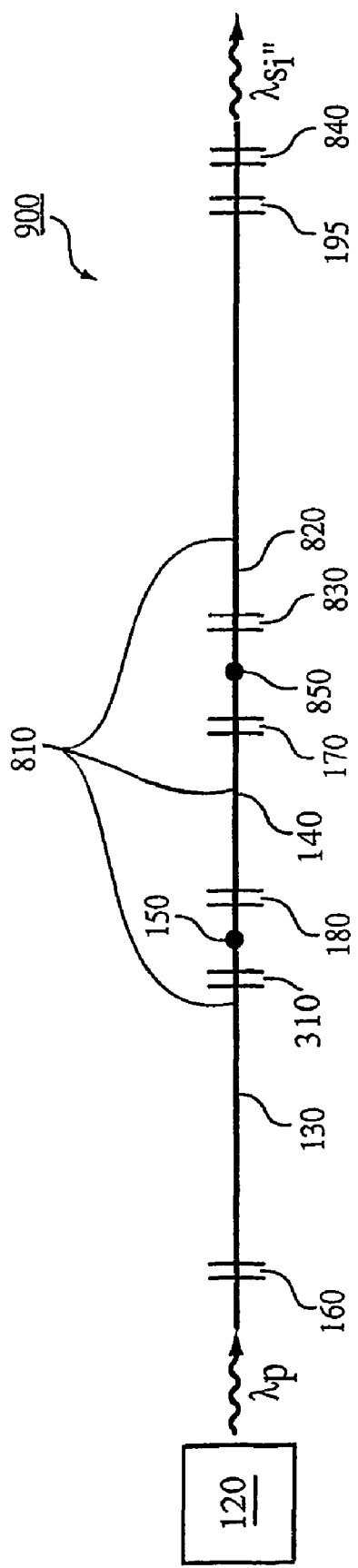
FIG. 9 is a schematic representation of an embodiment of a Raman fiber laser system.
Figure 10:
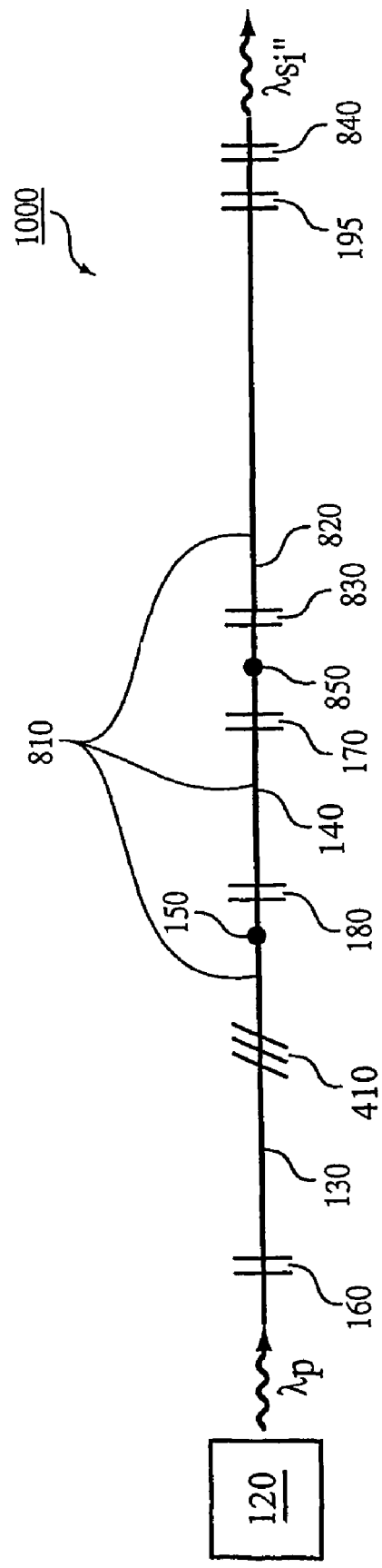
FIG. 10 is a schematic representation of an embodiment of a Raman fiber laser system.
Figure 11:
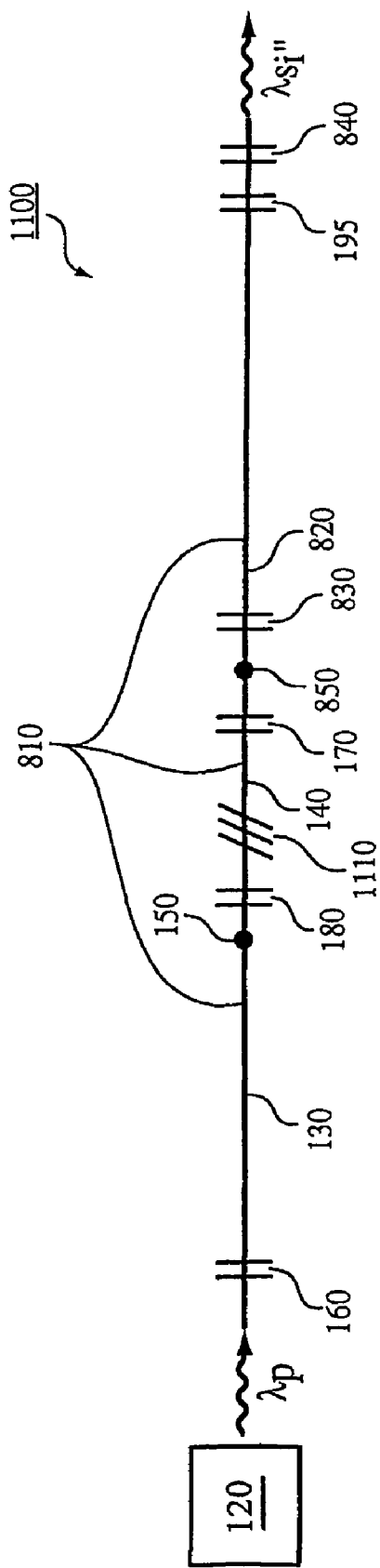
FIG. 11 is a schematic representation of an embodiment of a Raman fiber laser system.
Figure 12:
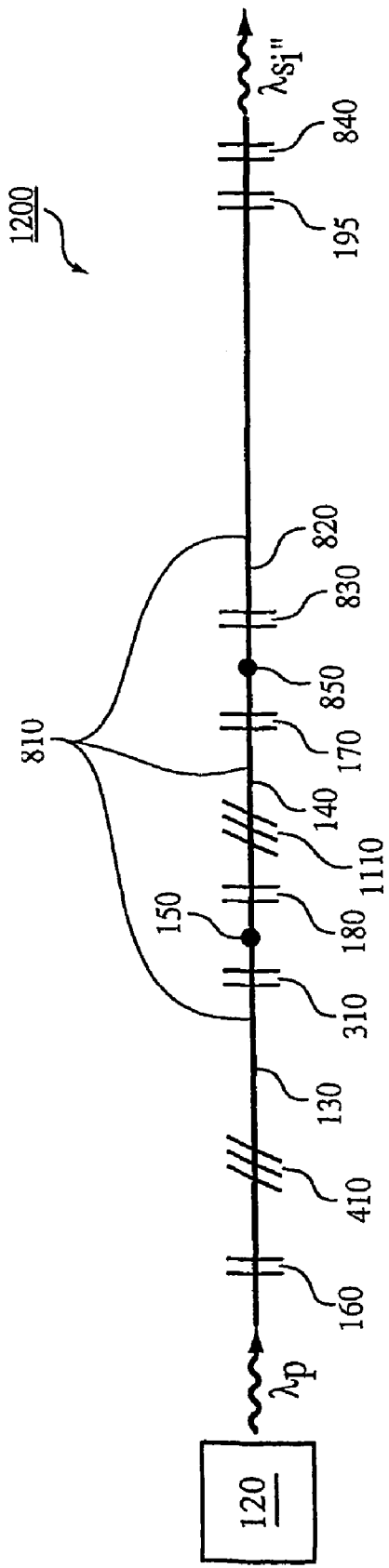
FIG. 12 is a schematic representation of an embodiment of a Raman fiber laser system.

FIG. 9 shows a Raman fiber laser system 900 that includes reflector 310 in section 130 of fiber 810. FIG. 10 shows a Raman fiber laser system 1000 that includes a suppressor 410 in section 130 of fiber 810. FIG. 11 shows a Raman fiber laser system 1100 that includes a suppressor 1110 in section 140 of fiber 810. Suppressor 1110 can be, for example, an LPG with a resonance frequency of $(c/\lambda_{s1'})$. FIG. 12 shows a Raman fiber laser system 1200 having suppressors 410 and 1110, and reflector 310.

Figure 13:
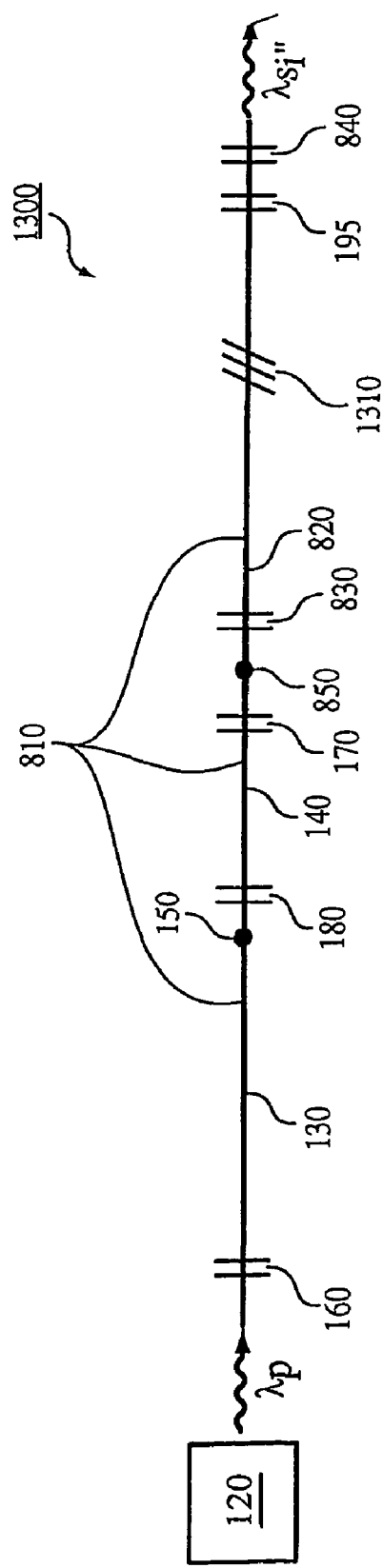
FIG. 13 is a schematic representation of an embodiment of a Raman fiber laser system.

FIG. 13 shows an embodiment of a Raman fiber laser system 1300 that includes a suppressor 1310 in section 820 of optical fiber 810. Suppressor 1310 is designed to suppress the formation of energy at higher order Raman Stokes shifts (e.g., one or more of $\lambda_{s2''}$, $\lambda_{s3''}$, $\lambda_{s4''}$, etc.). Suppressor 1310 can be, for example, an LPG having its resonance frequency at $(c/\lambda_{s2''})$, where $\lambda_{s2''}^{-1} = \lambda_{s1''}^{-1} - \lambda_{r''}^{-1}$. The presence of suppressor 1310 in section 820 may be desirable, for example, when the power of wave $\lambda_{s1''}$ in section 820 is sufficiently high that the power of wave $\lambda_{s2''}$ (and/or energy at higher order Raman Stokes shifts for the active material in the gain medium of section 820 of fiber 810) that would form in section 820 in the absence of suppressor 1310 would substantially interfere with the desired performance of the system. System 1300 can optionally include reflector 310, suppressor 410 and/or suppressor 1110.

While FIGS. 8-13 show the reflectors and/or suppressor(s) having particular locations within optical fiber 810, it is to be understood that these components can have different locations (relative locations and/or absolute locations) within fiber 810. For example, the relative positions of reflectors 195 and 840 can be reversed. As another example, reflector 310 can be located in section 140 of fiber 810. As an additional example, reflector 170 can be disposed in section 820 of fiber 810. As a further example, reflector 180 can be disposed in section 130 of fiber 810. Combinations of these configurations can be used. Other locations of these components in fiber 810 are also contemplated.

While embodiments have been shown in which sections 130, 140 and 820 are spliced together, the invention is not limited in this sense. Generally, sections 130, 140 and/or 820 are spliced together if they are formed of different materials. When sections 130, 140 and 820 are formed of the same materials, splicing is not required.

While Raman fiber lasers and Raman fiber laser systems having an optical fiber with two or three sections have been described, the invention is not limited to these systems. In general, an optical fiber can have N sections, where N is an integer (e.g., 2, 3, 4, 5, 6, 7, 8, 9, 10, 11, 12, 13, 14, 15, 16, 17, 18, 19, 20, etc.).

Moreover, while Raman fiber lasers and Raman fiber laser systems have been described with particular arrangements of active material in their respective gain media, other arrangements are also possible. In general, each section of the optical fiber can have a gain medium with an active material which can be the same or different than the active material in the gain medium of the neighboring section(s) of the fiber. In some embodiments, all sections of the optical fiber have a gain medium with the same active material. In certain embodiments, each section of the optical fiber has a gain medium with a different active material than the active material in the gain medium of the other sections. In some embodiments, the active material in the gain medium of neighboring sections can alternate. For example, a three-section optical fiber can be formed in which the active material in the gain medium of the first and third sections is the same, and in which the active material in the gain medium in the middle section is different. Other arrangements are contemplated.

Furthermore, while Raman fiber lasers and Raman fiber laser systems have been described in which sections of the optical fiber are spliced together, the invention is not limited in this sense. Generally, the sections of fiber are coupled together so that energy can propagate therebetween. Typically, the sections of fiber are contiguous. For example, in some embodiments, two neighboring sections of the optical fiber can have an interferometric connection. In certain embodiments, two neighboring sections of the optical fiber can be connected by a lens (e.g., a GRIN lens).

A typical design of a Raman fiber laser having N sections of optical fiber is as follows. The section of fiber closest to where the pump energy at wavelength $\lambda_p$ enters the fiber has a reflector designed to reflect substantially all (e.g., about 100%) energy at $\lambda_{s1}$. The section of fiber furthest (the $N^{th}$ section of the fiber) from where the pump energy $\lambda_p$ enters the fiber has three reflectors. One reflector is designed to partially reflect energy at $\lambda_{s1n}$ (i.e., the desired wavelength of energy created by the system in the $N^{th}$ section of the fiber), where $\lambda_{s1n}^{-1} = \lambda_{s1(n-1)}^{-1} - \lambda_{rn}^{-1}$, $\lambda_{s1(n-1)}$ is the desired wavelength of energy created by the system in the $(N-1)^{th}$ section of the fiber, and $(c/\lambda_{rn})$ is the Raman Stokes shift frequency for the active material in the $N^{th}$ section of the fiber. Another reflector in section N is designed to reflect substantially all (e.g., about 100%) energy propagating in the $N^{th}$ section at $\lambda_{s1n}$. The other reflector in section N is designed to reflect substantially all (e.g., about 100%) energy propagating in the $N^{th}$ section at $\lambda_{s1(n-1)}$ (i.e., the desired wavelength of energy created by the system in the $(N-1)^{th}$ section of the fiber), where $\lambda_{s1(n-1)}^{-1} = \lambda_{s1(n-2)}^{-1} - \lambda_{r(n-1)}^{-1}$, $\lambda_{s1(n-2)}$ is the desired wavelength of energy created by the system in the $(N-2)^{th}$ section of the fiber, and $(c/\lambda_{r(n-1)})$ is the Raman Stokes shift frequency for the active material in the $(N-1)^{th}$ section of the fiber.

For any remaining sections of fiber (generically referred to as the $M^{th}$ section of fiber, where M is an integer greater than one and less than N), each section has two reflectors. One reflector is designed to reflect substantially all (e.g., about 100%) energy propagating in the $M^{th}$ section at wavelength $\lambda_{s1m}$ (i.e., the desired wavelength of energy created by the system in the $M^{th}$ section of the fiber), where $\lambda_{s1m}^{-1} = \lambda_{s1(m-2)}^{-1} - \lambda_{rm}^{-1}$, $\lambda_{s1(m-2)}$ is the desired wavelength of energy created by the system in the $(M-1)^{th}$ section of the fiber, and $(c/\lambda_{rm})$ is the Raman Stokes shift frequency for the active material in the $M^{th}$ section of the fiber. The other reflector is designed to reflect substantially all (e.g., about 100%) energy propagating in the $M^{th}$ section at wavelength $\lambda_{s1(m-1)}$ (i.e., the desired wavelength of energy created by the system in the $(M-1)^{th}$ section of the fiber), where $\lambda_{s1(m-1)}^{-1} = \lambda_{s1(m-2)}^{-1} - \lambda_{r(m-1)}^{-1}$, $\lambda_{s1(m-2)}$ is the desired wavelength of energy created by the system in the $(M-2)^{th}$ section of the fiber and $(c/\lambda_{r(m-1)})$ is the Raman Stokes shift frequency for the active material in the $(M-1)^{th}$ section of the fiber.

Each section of fiber can optionally include a suppressor (e.g., an LPG with a resonance frequency corresponding to energy at an undesired higher order Raman Stokes shift energy).

The system can optionally include a reflector designed to reflect substantially all (e.g., about 100%) energy impinging thereon at wavelength $\lambda_p$.

While certain embodiments of a Raman fiber laser having N sections of optical fiber have been described, it is to be understood that the invention is not limited to these embodiments. For example, the relative positioning of the reflectors and/or suppressor(s) can be modified (e.g., in a similar manner to that noted above). Other embodiments are also contemplated.

Generally, an optical fiber having N sections can convert energy entering the optical fiber at a particular wavelength (e.g., $\lambda_p$) to energy exiting the optical fiber at a different (e.g., wavelength $\lambda_{s1n}$, where $\lambda_{s1n}$ is the desired wavelength of energy created by the system in the $N^{th}$ section of the fiber) with relatively high efficiency. In certain embodiments, fiber 110 can convert at least about 55% (e.g., at least about 60%, at least about 65%, at least about 70%, at least about 75%, at least about 80%, at least about 85%, at least about 90%, at least about 95%, at least about 98%) of the energy entering fiber 110 at one wavelength (e.g., $\lambda_p$) to energy exiting fiber 110 at a different wavelength (e.g., $\lambda_{s1n}$).

Optical fiber 110 can convert energy entering fiber 110 at a particular wavelength (e.g., $\lambda_p$) to energy exiting fiber 110 at wavelengths other than a desired output wavelength (e.g., at wavelengths other than $\lambda_{s1n}$) with relatively low efficiency. In certain embodiments, fiber 110 can convert at most about 45% (e.g., at most about 40%, at most about 35%, at most about 30%, at most about 25%, at most about 20%, at most about 15%, at most about 10%, at most about 5%, at most about 2%) of the energy entering fiber 110 at a particular wavelength ($\lambda_p$) to energy exiting fiber 110 at wavelengths other than a desired wavelength (e.g., $\lambda_{s1n}$).

While certain embodiments have been described, the invention is not limited to these embodiments. For example, one or more sections of an optical fiber can be substantially devoid of a gain medium having an active material. As a further example, the reflectors need not be in the form of fiber Bragg gratings. For example, one or more of the reflectors can be a loop mirror, or one or more reflectors can be in the form of a coated mirror (e.g., a coated mirror at one or both ends of a section of optical fiber). As another example, the suppressor(s) need not be in the form of LPG(s). For example, one or more of the suppressors can be in the form of gratings (e.g., short period gratings) that are substantially nonperpendicular to the length of the fiber along which energy propagates. In these embodiments, the angle and/or period of the gratings can be selected to scatter one or more wavelengths of interest (e.g., one or more higher order Raman Stokes shift wavelengths). As an additional example, the type of laser used for pumping can be varied. Examples of lasers that can be used include semiconductor diode lasers (e.g., high power semiconductor diode lasers), double clad doped fiber lasers, conventional free space coupled lasers, and the like. As another example, various types of optical fibers can be used, including, for example, double clad optical fibers and polarization maintaining optical fibers. Furthermore, the optical fibers can be formed of, for example, silica based materials (e.g., fused silica based) or fluoride-based materials. As yet another example, the relative and/or absolute lengths of one or more of the sections of the optical fiber can be varied based upon the intended use of the Raman fiber laser.

Figure 14:
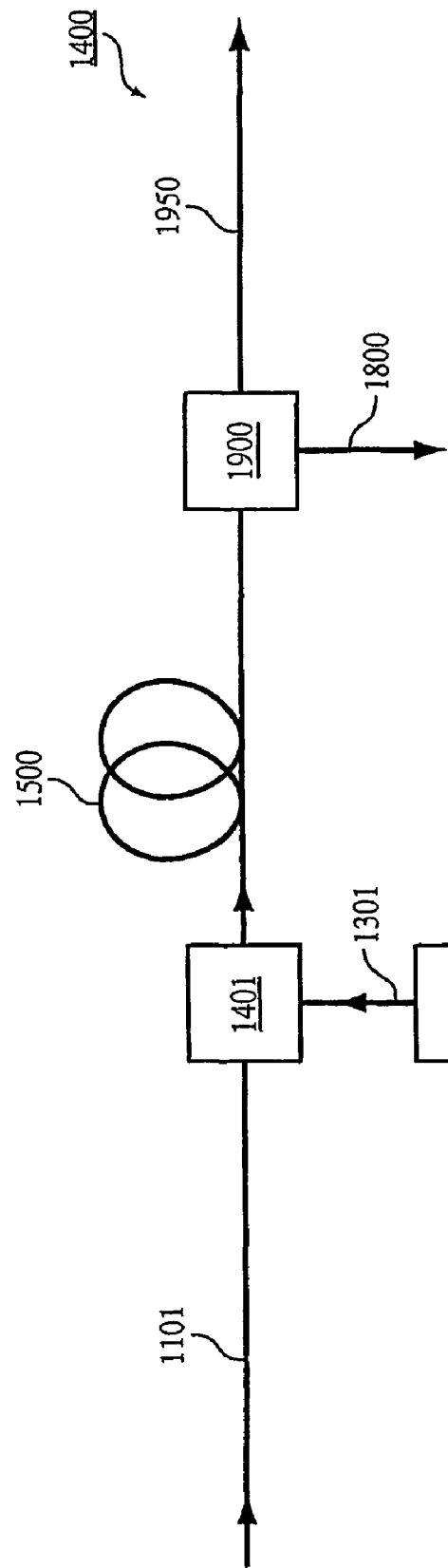
FIG. 14 is a schematic representation of an embodiment of a fiber amplifier system.

Moreover, while the fibers and systems have been described as Raman fiber lasers and Raman fiber laser systems, those skilled in the art will appreciate that the general concepts described can be extended to provide amplifiers and amplifier systems. Generally, a fiber amplifier provides gain for energy at a wavelength of interest without the use of a lasing cavity (e.g., without a resonator) or with an optical cavity operating below lasing threshold. FIG. 14 is a schematic view of an embodiment of a fiber amplifier system 1400 in which fiber 1500 is used as a signal amplifier. Fiber 1500 contains multiple sections (e.g., as described above but having at least one section, such as the section adjacent the signal output, operating below lasing threshold). To operate at below lasing threshold, for example, one or more of the reflectors can be removed from fiber 1500 and/or the reflectivity of one or more of the reflectors can be reduced. An input signal enters system 1400 via fiber 1101. Energy source 1201 emits a pump signal 1301. The input signal in fiber 1101 and pump signal 1301 are coupled into fiber 1500 via coupler 1401. Such couplers are known to those skilled in the art. Pump signal 1301 interacts with the active material(s) in the sections of fiber 1500, and the input signal is amplified. A device 1900 (e.g., an isolator) separates the amplified input signal from the Stokes shifted pump signal so that the Stokes shifted pump signal travels along fiber 1800, and the amplified input signal travels along fiber 1950. While FIG. 14 shows one embodiment of fiber 1500 in a fiber amplifier system, other fiber amplifier systems in which fiber 1500 can be used will be apparent to those of skill in the art.

Other embodiments are in the claims.

What is claimed is:

1. Optical fiber apparatus, comprising:
   an optical fiber having a first section and a second section coupled to the first section, the first section having a gain medium including a first active material and the second section having a gain medium including a second active material;
   a first reflector disposed in the first section of the optical fiber, the first reflector being configured to reflect substantially all energy impinging thereon at a first wavelength;
   a second reflector disposed in the optical fiber outside the first section of the optical fiber, the second reflector being configured to reflect substantially all energy impinging thereon at the first wavelength; and
   a third reflector disposed in the optical fiber, the third reflector being configured to partially reflect energy impinging thereon at a second wavelength different than the first wavelength.

2. The optical fiber apparatus of claim 1, wherein the first active material is the same as the second active material.

3. The optical fiber apparatus of claim 1, wherein the first active material is different than the second active material.

4. The optical fiber apparatus of claim 3, wherein the first and second sections are spliced together.

5. The optical fiber apparatus of claim 4, wherein the second reflector comprises a fiber Bragg grating.

6. The optical fiber apparatus of claim 5, wherein the first active material comprises $GeO_2$.

7. The optical fiber apparatus of claim 6, wherein the second active material comprises $P_2O_5$.

8. The optical fiber apparatus of claim 3, wherein the first reflector comprises a fiber Bragg grating.

9. The optical fiber apparatus of claim 3, wherein the second reflector comprises a fiber Bragg grating.

10. The optical fiber apparatus of claim 3, wherein the first active material comprises $GeO_2$.

11. The optical fiber apparatus of claim 10, wherein the second active material comprises $P_2O_5$.

12. The optical fiber apparatus of claim 3, wherein the first active material comprises $P_2O_5$.

13. The optical fiber apparatus of claim 3 wherein the fiber comprises a Raman laser or amplifier and wherein the fiber further comprises a fourth reflector disposed in the optical fiber between said first and second reflectors, the fourth reflector configured to reflect substantially all energy impinging thereon at the second wavelength.

14. The optical fiber apparatus of claim 13, wherein a length of fiber of the first section having the first active material and a length of fiber of the second section having the second active material are interposed between said first and second reflectors.

15. The optical fiber apparatus of claim 3, wherein the third reflector comprises a fiber Bragg grating.

16. The optical fiber apparatus of claim 3, wherein the third reflector is disposed outside the first section of the optical fiber.

17. The optical fiber apparatus of claim 16, wherein the third reflector is between the first and second reflectors.

18. The optical fiber apparatus of claim 3, wherein the first and second sections are spliced together.

19. The optical fiber apparatus of claim 3, further comprising a fourth reflector disposed in the optical fiber.

20. The optical fiber apparatus of claim 19, wherein the fourth reflector comprises a fiber Bragg grating.

21. The optical fiber apparatus of claim 19, wherein the fourth reflector is disposed outside the first section of the optical fiber.

22. The optical fiber apparatus of claim 21, wherein the fourth reflector is between the first and third reflectors.

23. The optical fiber apparatus of claim 19, wherein the fourth reflector is configured to reflect substantially all energy impinging thereon at the second wavelength.

24. The optical fiber apparatus of claim 19, wherein the fourth reflector is disposed in the first section of the optical fiber.

25. The optical fiber apparatus of claim 19, wherein the first and second sections are spliced together.

26. The optical fiber apparatus of claim 19, further comprising a fifth reflector disposed in the optical fiber.

27. The optical fiber apparatus of claim 26, wherein the fifth reflector comprises a fiber Bragg grating.

28. The optical fiber apparatus of claim 26, wherein the fifth reflector is disposed in the first section of the optical fiber.

29. The optical fiber apparatus of claim 28, wherein the fifth reflector is between the first and fourth reflectors.

30. The optical fiber apparatus of claim 26, wherein the fifth reflector is configured to reflect substantially all energy impinging thereon at a wavelength different than the first wavelength.

31. The optical fiber apparatus of claim 26, wherein the first and second sections are spliced together.

32. The optical fiber apparatus of claim 3, wherein the first and second sections of the optical fiber are contiguous.

33. The optical fiber apparatus of claim 3, wherein the fiber is configured to be a fiber laser.

34. The optical fiber apparatus of claim 3, wherein the fiber is configured to be a fiber amplifier.

35. Optical fiber apparatus, comprising:
an optical fiber having a first section and a second section coupled to the first section, the first section having a gain medium including a first active material and the second section having a gain medium including a second active material;
a first reflector disposed in the first section of the optical fiber, the first reflector being configured to reflect substantially all energy impinging thereon at a first wavelength;
a second reflector disposed in the optical fiber outside the first section of the optical fiber, the second reflector being configured to reflect substantially all energy impinging thereon at the first wavelength;
a third reflector disposed in the optical fiber, a fourth reflector disposed in the optical fiber and a fifth reflector disposed in the optical fiber; and
a suppressor disposed in the optical fiber, the suppressor being capable of substantially suppressing the propagation of energy within the optical fiber at a wavelength corresponding to a higher order Raman shift wavelength than the first wavelength.

36. The optical fiber apparatus of claim 35, wherein the suppressor is disposed in the first section of the optical fiber.

37. The optical fiber apparatus of claim 36, wherein the suppressor is between the first and fifth reflectors.

38. The optical fiber apparatus of claim 35, wherein the suppressor comprises a long period grating.

39. The optical fiber apparatus of claim 35, wherein the first and second sections are spliced together.

40. The optical fiber apparatus of claim 35, wherein the first active material comprises $GeO_2$.

41. The optical fiber apparatus of claim 40, wherein the second active material comprises $P_2O_5$.

42. The optical fiber apparatus of claim 35, wherein the second active material comprises $P_2O_5$.

43. Optical fiber apparatus, comprising:
an optical fiber having a first section and a second section coupled to the first section, the first section having a gain medium including a first active material and the second section having a gain medium including a second active material;
a first reflector disposed in the first section of the optical fiber, the first reflector being configured to reflect substantially all energy impinging thereon at a first wavelength;
a second reflector disposed in the optical fiber outside the first section of the optical fiber, the second reflector being configured to reflect substantially all energy impinging thereon at the first wavelength; and
a suppressor disposed in the first section of the optical fiber and between the first and second reflectors, the suppressor being capable of substantially suppressing the propagation of energy within the optical fiber at a wavelength corresponding to a higher order Raman shift wavelength than the first wavelength.

44. The optical fiber apparatus of claim 43, further comprising a third reflector disposed in the first section of the optical fiber and between the first and second reflectors, the third reflector being configured to reflect substantially all energy impinging thereon at a second wavelength different than the first wavelength.

45. The optical fiber apparatus of claim 43, wherein the suppressor comprises a long period grating.

46. The optical fiber apparatus of claim 43 wherein said first active material is different than said second active material.

47. The optical fiber apparatus of claim 46 comprising a third reflector configured to reflect energy impinging thereon having a second wavelength that is different than the first wavelength.

48. The optical fiber apparatus of claim 47 wherein the third reflector is between the first and second reflectors and is configured to reflect substantially all energy impinging thereon at the second wavelength.

49. The optical fiber apparatus of claim 47 wherein the third reflector is configured to partially reflect energy impinging thereon at the second wavelength.

50. The optical fiber apparatus of claim 47 comprising a fourth reflector disposed in the optical fiber between said first and second reflectors, the fourth reflector configured to reflect substantially all energy impinging thereon at the second wavelength.

51. The optical fiber apparatus of claim 50, wherein fiber of the second section having said second active material is interposed between the third and fourth reflectors and has a first length and wherein if any fiber of the first section having said first active material is interposed between the third and fourth reflectors the length of such fiber is less than the first length.

52. The optical fiber apparatus of claim 46 wherein the first and second sections are coupled by a lens.

53. Optical fiber apparatus, comprising:
an optical fiber having a first section and a second section coupled to the first section, the first section having a gain medium including a first active material and the second section having a gain medium including a second active material different than the first active material;
a first reflector disposed in the optical fiber, the first reflector being configured to reflect substantially all energy impinging thereon at a first wavelength;
a second reflector disposed in the optical fiber, the second reflector being configured to reflect substantially all energy impinging thereon at the first wavelength;
a third reflector disposed in the optical fiber, the third reflector being configured to partially reflect energy impinging thereon at a second wavelength different than the first wavelength; and
a fourth reflector disposed in the optical fiber and between the first and third reflectors, the fourth reflector being configured to reflect substantially all energy impinging thereon at the second wavelength.

54. The optical fiber apparatus of claim 53, further comprising a fifth reflector in the optical fiber and between the first and fourth reflectors, the fifth reflector being configured to reflect substantially all energy impinging thereon at a third wavelength different than the first and second wavelengths.

55. The optical fiber apparatus of claim 54, further comprising a suppressor in the optical fiber and between the first and fifth reflectors, the suppressor being capable of substantially suppressing the propagation of energy within the optical fiber at a wavelength corresponding to a higher order Raman shift wavelength than the first wavelength.

56. The optical fiber apparatus of claim 55, wherein the first active material comprises $P_2O_5$.

57. The optical fiber apparatus of claim 55, wherein the first active material comprises $GeO_2$.

58. The optical fiber apparatus of claim 57, wherein the second active material comprises $P_2O_5$.

59. The optical fiber apparatus of claim 58, wherein the first and second sections of the optical fiber are spliced together.

60. The optical fiber apparatus of claim 58, wherein the first and second sections of the optical fiber are contiguous.

61. The optical fiber apparatus of claim 53, further comprising a suppressor in the optical fiber and between the first and fifth reflectors, the suppressor being capable of substantially suppressing the propagation of energy within the optical fiber at a wavelength corresponding to a higher order Raman shift wavelength than the first wavelength.

62. The optical fiber apparatus of claim 53, wherein the first active material comprises $GeO_2$.

63. The optical fiber apparatus of claim 62, wherein the second active material comprises $P_2O_5$.

64. The optical fiber apparatus of claim 53, wherein the first active material comprises $P_2O_5$.

65. The optical fiber apparatus of claim 64, wherein the second active material comprises $GeO_2$.

66. The optical fiber apparatus of claim 53, wherein the first and second sections of the optical fiber are spliced together.

67. The optical fiber apparatus of claim 53, wherein the first and second sections of the optical fiber are contiguous.

68. The optical fiber apparatus of claim 53, wherein the fiber is configured to be a fiber laser.

69. The optical fiber apparatus of claim 53, wherein the fiber is configured to be a fiber amplifier.

70. The optical fiber apparatus of claim 53, wherein fiber of the second section having said second active material is interposed between the third and fourth reflectors and has a first length wherein if any fiber of the first section having said first active material is interposed between the third and fourth reflectors the length of such fiber is less than the first length.

71. The optical fiber apparatus of claim 70, wherein a length of fiber of the first section having the first active material and a length of fiber of the second section having the second active material are interposed between said first and second reflectors.

72. A fiber system, comprising:
an energy source capable of emitting energy at a pump wavelength; and
a fiber, comprising:
an optical fiber having a first section and a second section coupled to the first section, the first section having a gain medium including a first active material and the second section having a gain medium including a second active material different than the first active material;
a first reflector disposed in the optical fiber, the first reflector being configured to reflect substantially all energy impinging thereon at a first wavelength;
a second reflector disposed in the optical fiber, the second reflector being configured to reflect substantially all energy impinging thereon at the first wavelength;
a third reflector disposed in the optical fiber, the third reflector being configured to partially reflect energy impinging thereon at a second wavelength different than the first wavelength;
a fourth reflector disposed in the optical fiber and between the first and third reflectors, the fourth reflector being configured to reflect substantially all energy impinging thereon at the second wavelength; and
wherein the energy source and the optical fiber are configured so that energy at the pump wavelength emitted by the energy source can be coupled into the optical fiber.

73. The system of claim 72, wherein the energy source comprises a laser.

74. The system of claim 73, wherein the energy source is capable of lasing at the pump wavelength.

75. The system of claim 72, wherein the fiber is configured to be a fiber laser.

76. The system of claim 72, wherein the fiber is configured to be a fiber amplifier.

77. Optical fiber apparatus, comprising:
an optical fiber having N sections, the N sections being coupled together, at least one of the N sections of the optical fiber having a gain medium with an active material; and
a plurality of reflectors disposed in the optical fiber, said plurality including two reflectors having respective wavelengths at which each is configured to reflect substantially all of the energy impinging thereon and wherein said respective wavelengths can be the same or can be different;
wherein N is an integer having a value of at least three;
said N sections comprising a first section with an end and configured to receive energy at a wavelength $\lambda_p$, the first section of the optical fiber having a first reflector of said two reflectors disposed therein, the wavelength at which the first reflector is configured to reflect substantially all energy impinging thereon comprising $\lambda_{s1}$, where $\lambda_{s1}^{-1}=\lambda_p^{-1}-\lambda_{r1}^{-1}$, and $(c/\lambda_{r1})$ is the Raman Stokes shift frequency for an active material in a gain medium in the first section of the optical fiber, and c is the speed of light;
wherein said $N^{th}$ section comprises an end opposite the end of the first section, the $N^{th}$ section of the optical fiber having the second reflector of said two reflectors disposed therein, the wavelength at which said second reflector is configured to reflect substantially all energy impinging thereon comprising $\lambda^{s1n}$, where for the $N^{th}$ section $\lambda_{s1n}^{-1}=\lambda_{s1(n-1)}^{-1}-\lambda_{rn}^{-1}$, where n=N and $(c/\lambda_{rn})$ is the Raman Stokes shift frequency for an active material in a gain medium in the $N^{th}$ section of the optical fiber and wherein the $(N-1)^{th}$ section creates energy having the wavelength $\lambda^{s1(n-1)}$; and
wherein said optical fiber includes a third reflector disposed in the $N^{th}$ section of the optical fiber, the third reflector being configured to partially reflect energy impinging thereon at the wavelength $\lambda_{s1n}$.

78. The optical fiber apparatus of claim 77, wherein N is four.

79. The optical fiber apparatus of claim 77, wherein N is five.

80. The optical fiber apparatus of claim 77, wherein N is six.

81. The optical fiber apparatus of claim 77, wherein at least two of the N sections of the optical fiber have a gain medium with an active material.

82. The optical fiber apparatus of claim 81, wherein the active material in one of the at least two of the N sections of the optical fiber is different than an active material of another of the N sections of the optical fiber having a gain medium.

83. The optical fiber apparatus of claim 77, wherein each of the N sections of the optical fiber have a gain medium with an active material.

84. The optical fiber apparatus of claim 77, wherein, the $N^{th}$ section of the optical fiber has an additional reflector disposed therein, the additional reflector being configured to reflect substantially all energy impinging thereon at the wavelength $\lambda_{s1(n-1)}$, where $\lambda_{s1(n-1)}^{-1}=\lambda_{s1(n-2)}^{-1}-\lambda_{r(n-1)}^{-1}$, and $(c/\lambda_{r(n-1)})$ is the Raman shift frequency for the active material in the $(N-1)^{th}$ section of the fiber and the $(N-2)^{th}$ section creates energy at the wavelength $\lambda_{s1(n-2)}$.

85. The optical fiber apparatus of claim 84, wherein for each of the remaining sections of the optical fiber, the remaining sections being those other than the first and $N^{th}$ sections and being individually designated by the index m, the fiber has two reflectors disposed therein, one of the reflectors being disposed in the $m^{th}$ section of the optical fiber and being configured to reflect substantially all energy impinging thereon at a wavelength $\lambda_{s1m}$, where $\lambda_{s1m}^{-1}=\lambda_{s1(m-1)}^{-1}-\lambda_{rm}^{-1}$, and $(c/\lambda_{rm})$ is the Raman Stokes shift frequency for an active material in the $m^{th}$ section of the fiber and the other reflector being configured to reflect energy at the wavelength $\lambda_{s1(m-1)}$ and $\lambda_{s11}$ represents the same wavelength as $\lambda_{s1}$.

86. The optical fiber apparatus of claim 85, wherein, for at least one of the $m^{th}$ sections, the other reflector configured to reflect energy at the wavelength $\lambda_{s1(m-1)}$ is disposed in the $m^{th}$ section.

87. The optical fiber apparatus of claim 85, wherein, for at least one of the $m^{th}$ sections, the other reflector configured to reflect energy at the wavelength $\lambda_{s1(m-1)}$ is disposed outside of the $m^{th}$ section.

88. The optical fiber apparatus of claim 77, wherein for each of the remaining sections of the optical fiber, the remaining sections being those other than the first and $N^{th}$ sections and being individually designated by the index m, the fiber has two reflectors disposed therein, one of the reflectors being disposed in the $m^{th}$ section of the optical fiber and being configured to reflect substantially all energy impinging thereon at a wavelength $\lambda_{s1m}$, where $\lambda_{s1m}^{-1}=\lambda_{s1(m-1)}^{-1}-\lambda_{rm}^{-1}$, and $(c/\lambda_{rm})$ is the Raman Stokes shift frequency for an active material in the $m^{th}$ section of the fiber and the other reflector being configured to reflect energy at the wavelength $\lambda_{s1(m-1)}$ and $\lambda_{s11}$ represents the same wavelength as $\lambda_{s1}$.

89. The optical fiber apparatus of claim 88, wherein, for at least one of the $m^{th}$ sections, the other reflector configured to reflect energy at the wavelength $\lambda_{s1(m-1)}$ is disposed in the $m^{th}$ section.

90. The optical fiber apparatus of claim 88, wherein, for at least one of the $m^{th}$ sections, the other reflector configured to reflect energy at the wavelength $\lambda_{s1(m-1)}$ is disposed outside of the $m^{th}$ section.

91. The optical fiber apparatus of claim 77, wherein the fiber is configured to be a fiber laser.

92. The optical fiber apparatus of claim 77, wherein the fiber is configured to be a fiber amplifier.

93. A fiber system, comprising:
an energy source; and
the optical fiber apparatus as recited in claim 77, said energy source coupled to the optical fiber apparatus.

94. The system of claim 93, wherein the fiber is configured to be a fiber laser.

95. The system of claim 93, wherein the fiber is configured to be a fiber amplifier.

96. A fiber laser or amplifier, comprising:
an optical fiber having at least first and second sections coupled together, the first section having a first gain medium with a first active material, the second section having a second gain medium with a second active material that is different than the first active material, the optical fiber being configured to be capable of receiving energy at a first wavelength and to be capable of outputting energy at a second wavelength longer than the first wavelength; and
a plurality of reflectors disposed in the optical fiber, the plurality of reflectors being configured so that energy propagating in the optical fiber at the first wavelength undergoes at least one Raman Stokes shift to create energy in the optical fiber at the second wavelength, and so that, when the optical fiber receives energy at the first wavelength, a power output by the optical fiber at the second wavelength is at least about 55% of a power of the energy the optical fiber receives at that first wavelength.

97. The fiber laser of claim 96, wherein the plurality of reflectors comprises first and second reflectors each configured to reflect substantially all energy impinging thereon at a selected wavelength.

98. The fiber laser of claim 96, comprising a third reflector disposed in the optical fiber between the first and second reflectors.

99. The fiber laser of claim 96, wherein energy propagating in the optical fiber at the first wavelength undergoes at least two Raman Stokes shifts to create energy in the optical fiber at the second wavelength.

100. The fiber laser of claim 96, wherein, when the optical fiber receives energy at the first wavelength, a power output by the optical fiber at wavelengths other than the first and second wavelengths is at most about 45% of the power of the energy the optical fiber receives at that first wavelength.

101. The fiber laser of claim 96, wherein the first and second sections are directly coupled together.

102. The fiber laser of claim 96, wherein the first and second sections are spliced together.

103. The fiber laser of claim 96, wherein energy propagating in the optical fiber at the first wavelength undergoes a Raman Stokes shift based interaction with the active material contained in the gain medium of the first section of the optical fiber to form energy at a first intermediate wavelength, and energy at the first intermediate wavelength undergoes a Raman Stokes shift based on interaction with the active material contained in the gain medium of the second section of the optical fiber to form a second intermediate wavelength.

104. The fiber laser of claim 103, wherein the second intermediate wavelength is the same as the second wavelength.

105. The fiber laser of claim 103, wherein energy propagating in the optical fiber at the second intermediate wavelength undergoes additional Raman Stokes shifts to form energy at the second wavelength.

106. Optical apparatus, comprising:
a Raman fiber laser or amplifier for lasing or providing amplification responsive to receiving energy having a pump wavelength $\lambda_p$, said Raman fiber laser or amplifier comprising an optical fiber having a plurality of sections, with at least two of the plurality of sections having Raman gain media containing different active materials for creating Stoke-shifted energy, said Raman fiber laser or amplifier further including a first reflector configured to reflect energy impinging thereon at the wavelength $\lambda_{s1}$, where $\lambda_{s1}^{-1}=\lambda_p^{-1}-\lambda_{r1}^{-1}$, and $(c/\lambda_{r1})$ is the Raman Stokes shift frequency for one of the different active materials, and c is the speed of light.

107. The optical apparatus of claim 106 comprising a second reflector, said second reflector being configured to reflect energy impinging thereon at the wavelength $\lambda_{s1}$.

108. The optical apparatus of claim 107 wherein each of said first and second reflectors is configured to reflect substantially all of the energy impinging thereon at $\lambda_{s1}$.

109. The optical apparatus of claim 107 comprising a third reflector, said third reflector being configured to reflect energy impinging thereon at a wavelength different than $\lambda_{s1}$.

110. The optical apparatus of claim 106 comprising a second reflector being configured to reflect energy impinging thereon at the wavelength $\lambda_{s1}$, said first and second reflectors to be referred to as a first pair of reflectors, said optical apparatus further comprising a second pair reflectors, each reflector of said second pair being configured to reflect energy impinging thereon at the wavelength $\lambda_{s12}$, where $\lambda_{s12}^{-1}=\lambda_{s1}^{-1}-\lambda_{r2}^{-1}$, and $(c/\lambda_{r2})$ is the Raman Stokes shift frequency for the other of the different active materials, and c is the speed of light.

111. The optical apparatus of claim 110 wherein fiber comprising one of said different active materials is not interposed between reflectors of one of said pairs of reflectors.

112. The optical apparatus of claim 110 wherein a length of fiber comprising one of said different active materials and a length of fiber comprising the other of said different active materials are interposed between the reflectors of one of said pairs of reflectors.

113. The optical apparatus of claim 112 wherein a selected length of fiber comprising one of said different materials is interposed between the reflectors of the other pair of reflectors.

114. The optical apparatus of claim 113 wherein if any length of fiber comprising the other of said different materials is interposed between the reflectors of said other pair of reflectors, such length is less than said selected length.

115. The optical apparatus of claim 110 wherein fiber comprising one of said different active materials is not interposed between reflectors of the other of said pairs of reflectors.

116. The optical apparatus of claim 110 wherein one of said reflectors of said second pair is located between said reflectors of said first pair.

117. The optical apparatus of claim 116 wherein each of said reflectors of said first pair is configured to reflect substantially all of the energy impinging thereon at the wavelength $\lambda_{s1}$.

118. The optical apparatus of claim 117 wherein each of said reflectors of said second pair is configured to reflect substantially all of the energy impinging thereon at the wavelength $\lambda_{s2}$.

119. The optical apparatus of claim 110 wherein one of said different active materials comprises $GeO_2$.

120. The optical apparatus of claim 110 wherein one of said different active materials comprises $P_2O_5$.

121. The optical apparatus of claim 120 wherein the other of said different active materials comprises $GeO_2$.

* * * * *